United States Patent
Pope et al.

(10) Patent No.: US 7,966,395 B1
(45) Date of Patent: Jun. 21, 2011

(54) SYSTEM AND METHOD FOR INDICATING INTEREST OF ONLINE CONTENT

(75) Inventors: Elmore Eugene Pope, Sammamish, WA (US); Brad E. Marshall, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 1635 days.

(21) Appl. No.: 11/238,079

(22) Filed: Sep. 28, 2005

Related U.S. Application Data

(60) Provisional application No. 60/710,549, filed on Aug. 23, 2005.

(51) Int. Cl.
*G06F 15/173* (2006.01)
(52) U.S. Cl. .................................................... 709/224
(58) Field of Classification Search ............ 709/228, 709/224
See application file for complete search history.

(56) References Cited

U.S. PATENT DOCUMENTS

| | | | |
|---|---|---|---|
| 6,134,244 A | 10/2000 | Van Renesse et al. | |
| 6,185,558 B1 | 2/2001 | Bowman et al. | |
| 6,233,571 B1 | 5/2001 | Egger et al. | |
| 6,266,649 B1 | 7/2001 | Linden et al. | |
| 6,411,967 B1 | 6/2002 | Van Renesse | |
| 6,529,953 B1 | 3/2003 | Van Renesse | |
| 6,584,504 B1 * | 6/2003 | Choe ............................ | 709/224 |
| 6,721,744 B1 * | 4/2004 | Naimark et al. ......... | 707/999.01 |
| 6,724,770 B1 | 4/2004 | Van Renesse | |
| 6,738,678 B1 | 5/2004 | Bharat et al. | |
| 6,757,682 B1 | 6/2004 | Naimark et al. | |
| 6,871,202 B2 | 3/2005 | Broder | |
| 6,912,505 B2 | 6/2005 | Linden et al. | |
| 7,552,365 B1 * | 6/2009 | Marsh et al. ..................... | 714/47 |
| 7,565,425 B2 * | 7/2009 | Van Vleet et al. ............. | 709/224 |
| 7,590,562 B2 * | 9/2009 | Stoppelman .................... | 705/26 |
| 7,594,189 B1 * | 9/2009 | Walker et al. .................. | 715/811 |
| 7,649,838 B2 * | 1/2010 | Fishteyn et al. ............... | 370/229 |

(Continued)

FOREIGN PATENT DOCUMENTS

WO 01/25947 4/2001

OTHER PUBLICATIONS

U.S. Appl. No. 11/012,880, filed Dec. 15, 2004.

(Continued)

*Primary Examiner* — Larry Donaghue
(74) *Attorney, Agent, or Firm* — Robert C. Kowert; Meyertons, Hood, Kivlin, Kowert & Goetzel, P.C.

(57) ABSTRACT

Systems and methods for displaying interest levels of online content. In one embodiment, a system may include a web browser. A badge code module may execute within an execution environment provided by the web browser and may display an indication of content interest associated with a content source, where the indication is dependent upon a time rate of change of content request traffic directed to the content source. In another embodiment, a system may include a web browser configured to generate a web browser window. A plugin module may be integrated with the web browser for execution, may generate a display interface integrated within the browser window, and may display an indication of content interest associated with a content source via the display interface, where the indication is dependent upon a time rate of change of content request traffic directed to the content source.

50 Claims, 13 Drawing Sheets

U.S. PATENT DOCUMENTS

| | | | |
|---|---|---|---|
| 2002/0178259 A1* | 11/2002 | Doyle et al. .................. | 709/225 |
| 2003/0121047 A1* | 6/2003 | Watson et al. .................. | 725/93 |
| 2004/0111508 A1* | 6/2004 | Dias et al. ..................... | 709/224 |
| 2005/0033803 A1* | 2/2005 | Vleet et al. .................... | 709/203 |
| 2005/0154701 A1 | 7/2005 | Parunak et al. | |
| 2005/0256866 A1* | 11/2005 | Lu et al. ........................... | 707/5 |
| 2006/0026153 A1 | 2/2006 | Soogoor | |
| 2006/0129916 A1* | 6/2006 | Volk et al. .................... | 715/513 |
| 2006/0190852 A1 | 8/2006 | Sotiriou | |
| 2006/0200443 A1* | 9/2006 | Kahn et al. ........................ | 707/1 |
| 2006/0265508 A1* | 11/2006 | Angel et al. .................. | 709/230 |
| 2007/0050387 A1* | 3/2007 | Busey ........................... | 707/101 |
| 2007/0112639 A1* | 5/2007 | Blumenau ...................... | 705/26 |
| 2008/0005273 A1* | 1/2008 | Agarwalla et al. ............ | 709/217 |

OTHER PUBLICATIONS

U.S. Appl. No. 10/910,457, filed Aug. 3, 2004.
U.S. Appl. No. 10/864,288, filed Jun. 9, 2004.
U.S. Appl. No. 11/611,696, filed Dec. 15, 2006.
U.S. Appl. No. 11/321,890, filed Dec. 29, 2005.
U.S. Appl. No. 11/321,895, filed Dec. 29, 2005.
U.S. Appl. No. 11/321,697, filed Dec. 29, 2005.
U.S. Appl. No. 11/478,919, filed Jun. 30, 2006.
U.S. Appl. No. 11/478,783, filed Jun. 30, 2006.
U.S. Appl. No. 11/479,225, filed Jun. 30, 2006
U.S. Appl, No, 11/186,357, filed Jul. 21, 2005.

Net Applications, "Are all web site statistics reports created equal?", Feb. 2005, 3 pages.
Net Applications, "How to maximize the ROI from your web site," Feb. 2005, 4 pages.
Martin, et al., "The privacy practices of web browser extensions," Privacy Foundation, Dec. 6, 2000, 61 pages.
Levy, "In the new game of tag, all of us are it," Newsweek, Apr. 18, 2005, 2 pages.
Harth, et al., "Collaborative filtering in a distributed environment: an agent-based approach," Technical report, University of Applied Sciences Wurzburg, Germany, Jun. 2001, 7 pages.
Vara, "New Search Engines Help Users Find Blogs," Wall Street Journal Online, Sep. 7, 2005.
Dowdell, "BlogPulse New & Improved Blog Search Engine," Marketing Shift blog, http://www.marketingshift.com/2005/7/blogpulse-new-improved-blog-search.cfm, Jul. 20, 2005, 55 pages.
Fry, "Organic Information Design," Master's Thesis, Massachusetts Institute of Technology, http://acg.media.mit.edu/people/fry/thesis/thesis-0522d.pdf, May 2000, 97 pages.
Van Renesse, et al., "Astrolabe: A robust and scalable technology for distributed system monitoring, management, and data mining," ACM Transactions on Computer Systems, May 2003, 43 pages.
Erinaki, et al., "SEWeP: Using site semantics and a taxonomy to enhance the web personalization process," Proceedings of the Ninth ACM SIGKDD International Conference on Knowledge Discovery and Data Mining, Aug. 2003, 10 pages.

* cited by examiner

Last Updated: 10:05:26

Top Destinations

| Weight | Link | |
|---|---|---|
| 38/10 | Phone Directory : Sara Jones | (drilldown) |
| 38/10 | Phone Directory : Carol Roberts | (drilldown) |
| 28/10 | Phone Directory : John Smith | (drilldown) |
| 28/20 | Wiki : CompanyTeams | (drilldown) |
| 28/10 | Phone Directory : Rob Thomas | (drilldown) |
| 28/20 | Phone Directory : Search Results | (drilldown) |
| 26/10 | Phone Directory : Kent Brockman | (drilldown) |
| 23/10 | Phone Directory : Steve Young | (drilldown) |
| 18/10 | Phone Directory : Joe Graziano | (drilldown) |
| 18/10 | Phone Directory : John Strubie | (drilldown) |
| 18/10 | Phone Directory : Mike Stadtler | (drilldown) |

FIG. 12A

Last Updated: 10:07:16

Top Destinations

| Weight | Link | |
|---|---|---|
| 62/10 | Phone Directory : Jerry Adams | (drilldown) |
| 43/10 | Order Entry | (drilldown) |
| 37/10 | Wiki : WebServicesUserManual | (drilldown) |
| 25/10 | Wiki : MarketingManual | (drilldown) |
| 22/10 | Phone Directory : Lynn Krebs | (drilldown) |
| 18/10 | Phone Directory : Tim Weber | (drilldown) |
| 18/10 | Graphs: QueryLog: inventory-latency | (drilldown) |
| 18/10 | Graphs: QueryLog: manager-summary | (drilldown) |
| 18/10 | Graphs: QueryLog: customer-summary | (drilldown) |
| 18/10 | Phone Directory : Anthony Gardener | (drilldown) |
| 18/10 | Phone Directory : Chuck Brown | (drilldown) |

FIG. 12B

Last Updated: 10:10:47

Top Destinations

| Weight | Link | |
|---|---|---|
| 171/10 | Wiki : Wiki Home | (drilldown) |
| 60/10 | Graphs: WebServUtilizationApp | (drilldown) |
| 32/10 | Phone Directory : Les Johnson | (drilldown) |
| 32/10 | Phone Directory : Deb Greco | (drilldown) |
| 30/20 | Wiki : CatalogFrameworkTools | (drilldown) |
| 20/10 | Phone Directory : Joe Cross | (drilldown) |
| 20/10 | Phone Directory : Gaylord Brantz | (drilldown) |
| 20/10 | Phone Directory : Ed McCaffrey | (drilldown) |
| 20/10 | Phone Directory : Mitch Moran | (drilldown) |
| 20/10 | Phone Directory : Sheryl Wilson | (drilldown) |
| 20/10 | Phone Directory : Ivan Claussen | (drilldown) |

*FIG. 12C*

Last Updated: 10:08:22

Wiki : Wiki Home

Destinations:

| Weight (l/g) | URL | |
|---|---|---|
| 0/190 | Wiki : Wiki | (drilldown) |
| 21/21 | Wiki : Search for 'Java' | (drilldown) |
| 16/20 | Wiki : Search for 'codereview' | (drilldown) |
| 9/18 | Wiki : Search for 'hitcount' | (drilldown) |
| 7/14 | Wiki : Search for 'gettext' | (drilldown) |
| 0/10 | Wiki : Search for 'crash' | (drilldown) |
| 1/10 | http://wiki.company.com/?VNC | (drilldown) |
| 0/9 | Wiki : Promotions | (drilldown) |
| 0/8 | Wiki : Media | (drilldown) |
| 4/8 | Wiki : Search for 'conference' | (drilldown) |

Referrers:

| Weight | URL | |
|---|---|---|
| 0/190 | Wiki : Wiki | (drilldown) |
| 0/0 | Wiki : by owner: asmith | (drilldown) |
| 2/0 | http://auth.company.com/jones/sign-in | (drilldown) |
| 0/0 | http://internal.company.com/ | (drilldown) |
| 0/0 | http://user121.company.com/cgi-bin/home.cgi | (drilldown) |
| 0/0 | Wiki : CatalogTools | (drilldown) |
| 0/0 | http://int.company.com/search/results.mhtml?query=wiki | (drilldown) |
| 0/0 | http://wiki.company.com/?TicketSubmit | (drilldown) |
| 0/0 | Wiki : MoveLogistics | (drilldown) |
| 0/0 | Wiki : TransactionalEvents | (drilldown) |

*FIG. 12D*

SYSTEM AND METHOD FOR INDICATING INTEREST OF ONLINE CONTENT

PRIORITY CLAIM

This application claims benefit of priority to U.S. Provisional Application No. 60/710,549, entitled "Method and System for Determining Interest Levels of Online Content Based on Rates of Change of Content Access" and filed Aug. 23, 2005, which is hereby incorporated by reference in its entirety.

BACKGROUND OF THE INVENTION

1. Field of the Invention

This invention relates to computing systems and, more particularly, to identifying the level of interest in computer-accessed content according to access characteristics associated with that content.

2. Description of the Related Art

As the reach and accessibility of computer networks such as the Internet increase, the amount of information accessible via such networks has grown exponentially. For example, as commercial enterprises increasingly embrace electronic commerce techniques, numerous websites offering information and purchasing opportunities for various products and services have appeared. Major media outlets commonly provide web-based versions of content previously available only through print or broadcast channels, and in some instances generate considerable volumes of content exclusively for web-based distribution. The reduction of cost, complexity and other barriers to entry into web-based content publishing has also facilitated the generation and dissemination of content by individual creators. This phenomenon is perhaps best illustrated by the increasing number and popularity of individually-authored web logs or "blogs," which offer content in a wide range of topics, styles and perspectives ranging from objective journalism to near-real-time autobiography.

As the amount of online content increases, the difficulty of locating content that is of general or specific interest also increases. Unlike libraries, which may employ standardized systems of content classification such as the Library of Congress System or the Dewey Decimal System, no standard for organizing and representing web-based content exists. Numerous search engines have evolved to attempt to index web pages according to the page contents (e.g., as given by the textual content actually displayed by the page when loaded into a browser or client, or by concealed metadata such as tags associated with or embedded within the page). Such search engines have further attempted to qualify the relevance of a given indexed page using other features of the page, such as its age and/or the number of links to the given indexed page from other indexed pages. For example, for a given keyword search, a page that satisfies the search criteria and is linked to from many sources may be considered a more relevant search result than a page having fewer external references.

Conventional index-based approaches to organizing online content suffer from a number of limitations. For example, such approaches are relatively static. Typical search engines gather information for indexing by "crawling" through web pages over periods of days or weeks, which may be insufficient to capture fast-moving or transient content. Further, numerous sources of content may be excluded from the indexing process, rendering the excluded content inaccessible to users of that search engine. For example, content hosts may deliberately refuse access to web-crawling tools, or a host may simply be too new or insufficiently relevant (e.g., according to absolute number of visitors or number of inbound links to content) to warrant indexing according to a search engine's indexing policy or strategy. Thus, users unaware of how to directly access excluded content (e.g., via a specific Uniform Resource Locator, or URL), may never be able to locate it.

Additionally, conventional approaches for determining the relevance of content may not correlate well with the actual usage of content. As described above, a given web page that is conventionally indexed may be assigned a high degree of relevance if there are a large number of links to that page from other pages. However, if few users actually navigate those links to reach the given page, the significance of the links in determining relevance is questionable. In fact, it is a commonplace tactic to distort the overall relevance of a particular web page by widely distributing specious links to that page across the Internet, thus elevating the ranking of the page within search results despite content that might not otherwise justify such a ranking.

SUMMARY

Various embodiments of a systems and methods for displaying interest levels of online content determined based on rates of change of content access traffic are disclosed. According to one embodiment, a system may include a web browser and a badge code module configured to execute within an execution environment provided by the web browser. The badge code module may be further configured to display an indication of content interest associated with a content source, where the indication is dependent upon a time rate of change of content request traffic directed to the content source.

In one particular implementation of the system, the web browser may be configured to download the badge code module from the content source for execution. In another particular implementation of the system, the content source may include a web page, where the web browser is configured to retrieve the web page from a host, and where a reference to the badge code module is embedded within the web page such that the web browser is configured to download the badge code module in response to retrieving the web page from the host.

In another embodiment, a system may include a web browser configured to generate a web browser window, and a plugin module configured to integrate with the web browser for execution and to generate a display interface integrated within the browser window. The plugin module may be further configured to display an indication of content interest associated with a content source via the display interface, where the indication is dependent upon a time rate of change of content request traffic directed to the content source.

In one particular implementation of this system, the display interface may include a toolbar. In another particular implementation of this system, the plugin module may be further configured to determine whether the indication of content interest satisfies a threshold notification criterion associated with the content source, and in response to determining that the indication satisfies the threshold notification criterion, to notify a user.

BRIEF DESCRIPTION OF THE DRAWINGS

FIGS. 12A-D illustrate one example of a type of content interest data display and the evolution of displayed content interest data over time.

Figure 1:
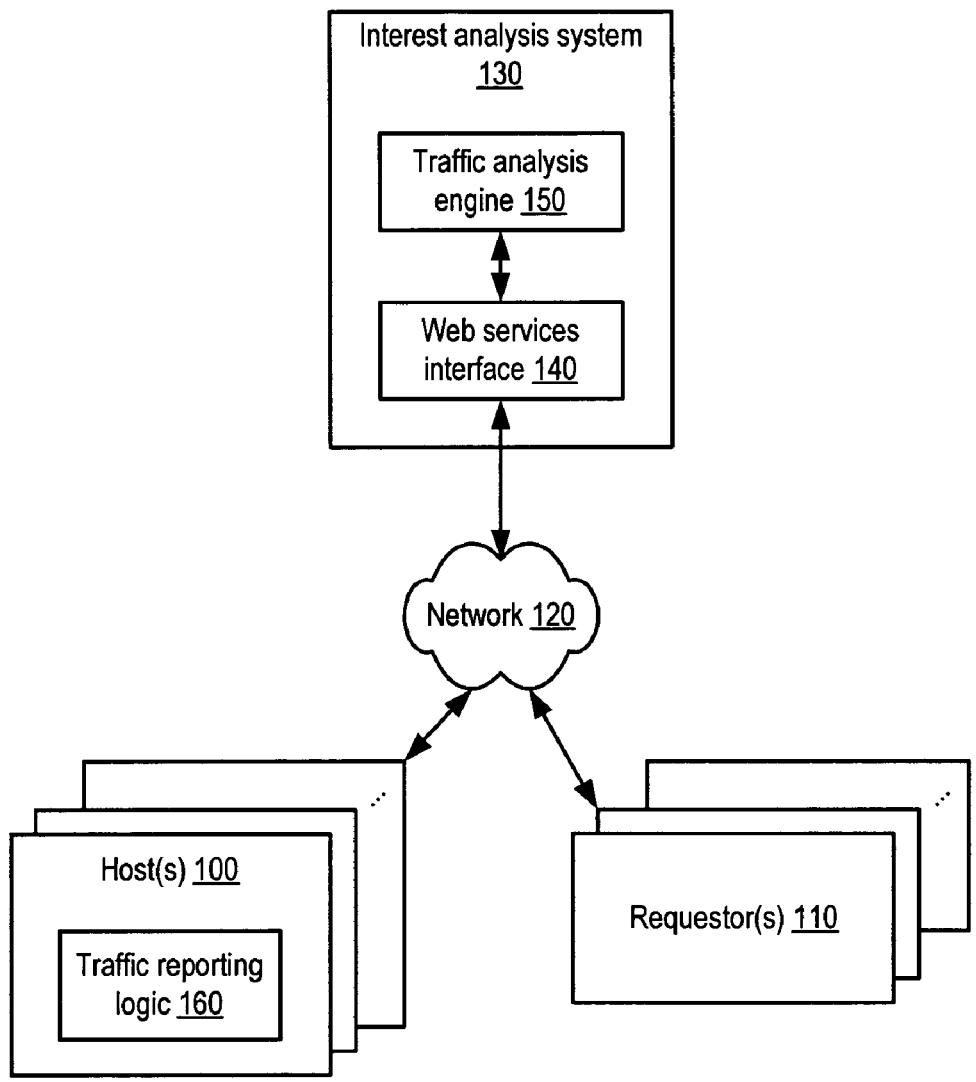
FIG. 1 is a block diagram illustrating one embodiment of a system configured for distribution of online content.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Introduction

As noted above, conventional schemes for indexing online content, e.g., by exhaustively crawling through such content, and statically ranking content relevance, e.g., by noting the degree of connectivity to content, may both overlook certain content and inaccurately represent its real interest to users. As an alternative approach, the interest level of online content may be determined on the basis of actual user access to such content. For example, content that is frequently requested by users (e.g., via a web browser or other type of device or interface) may be considered more interesting than content that that has many inbound links but few actual user requests. By associating a measure of content interest with actual user behavior relative to content, content interest may be determined dynamically. Indicated content interest may then rise and fall according to content access patterns that may reflect emergent properties of a networked community of users. It is noted that in some instances, the interest level of content may be a factor in or a proxy for the relevance of such content to a given user.

In some embodiments, content interest associated with online content may be determined according to the behavior of users or consumers of that content, as distinct from an owner or generator of the content, or an agent that may attempt to access online content with no interest or intent grounded in the content itself. For example, content interest may be associated with the general interest of a broad or narrow community of users for whom at least some degree of initial or continuing desire or curiosity for making use of online content is implicit in their acts of accessing such content. By contrast, the actions of an owner or generator of content may not be indicative of interest in the owned or generated content per se, but rather in the availability of such content for users. For example, the attempts of a web site owner to access his own site's content for debugging purposes may not indicate interest in the content itself, but rather some aspect of how the content appears or is conveyed. Similarly, a bad actor may maliciously attempt to access online content with the intention not of using the content but of creating a deleterious effect, such as a denial of service attack or a distortion of content usage metrics (e.g., "click fraud").

Sheer volume of user access requests to a given source of online content may not be the best indicator of interest, however. For example, the websites of major online retailers, media outlets, etc. process consistently large numbers of content requests through their home pages every day, with relatively minor and/or predictable fluctuations in request traffic relative to overall traffic volume. By contrast, a little-known website might suddenly see its traffic grow tenfold, perhaps due to media coverage, word of mouth, etc. If content interest were purely a function of the number of content access requests, the high-volume site with relatively consistent request traffic would continually be ranked as more interesting than the little-known site that exhibits considerable variance in request traffic. This may act to impair the discovery of new and potentially interesting sources of content. That is, determining content interest solely from access request volume (e.g., number of requests per hour, day, etc.) may be biased in favor of preserving the level of interest of already highly-ranked content sources at the expense of obscuring the level of interest of less-requested sources.

In some cases, such a bias may be overcome by defining a measure of content interest to account for a time rate of change of content request traffic, rather than simply the magnitude of the content request traffic. (Such a measure may be referred to interchangeably herein as a level or indication of interest, as content interest or simply as interest.) Considering the previous example, the overall rate of change of request traffic for high-volume sites may be relatively small at any given time. By contrast, traffic to a little-known website may exhibit a large rate of change, relative to its overall traffic volume, in a short period of time during a spike in traffic. By highlighting the rate of change of content request traffic, the burgeoning interest in the little-known website may be brought to the attention of users who otherwise may have never become aware of the content available at that site.

In the following sections, the behavior of an exemplary network-based system for requesting and conveying online content is discussed. Various methods for determining the level of interest of online content based on rate-of-change behavior of content request traffic are explored. Additionally, techniques for collecting and reporting request traffic as well as displaying the resulting interest analysis of such traffic are considered, and an exemplary computer system that may be configured to implement content request traffic data collection, analysis and/or reporting functions is discussed.

Overview of Online Content Distribution System

One embodiment of a system configured to facilitate the distribution of online content is illustrated in FIG. 1. In the illustrated embodiment, a number of hosts 100 are configured to receive requests for online content from a number of content requestors 110 via a network 120. Additionally, an interest analysis (IA) system 130 including a web services (WS) interface 140 and a traffic analysis (TA) engine 150 is configured to communicate with hosts 100 via network 120. As noted below in conjunction with the description of FIG. 11, in some embodiments some or all of the components illustrated in FIG. 1 may be partially or entirely implemented as computer-executable instructions and data stored via a computer-accessible medium.

Generally speaking, hosts 100 may be instances of online content sources, where a content source may encompass any suitable type of data that may be conveyed over a network, including but not limited to text documents, still image data, audio data, video data, metadata such as markup language tags, communication protocol data such as content preambles/epilogues, and so forth. In many embodiments, hosts 100 may be configured to provide online content to requestors 110 via web-based data request and transport protocols. For example, hosts 100 may be configured to host web sites implementing Uniform Resource Locators (URLs) corresponding to web pages, documents or other online content, and to receive requests for access to particular URLs formatted in a version of the Hypertext Transport Protocol (HTTP) data transport protocol. In response to such requests, hosts 100 may be configured to access the content corresponding to the requested URL and to provide it to the requestor 110 in accordance with the HTTP protocol. It is contemplated that in some embodiments, application layer data transport protocols other than or in addition to HTTP may be used to convey requests for content and the resulting content to and from hosts 100. For example, a secure, authenticated version of HTTP may be employed, as may a version of File Transfer Protocol (FTP) or any other suitable protocol.

In some embodiments, a given host 100 may be configured as a self-contained, standalone web server that both stores online content and receives and processes requests for stored content. In other embodiments, a given host 100 may be included within a complex content server architecture. For example, host 100 may be configured as an application or content server that does not actually store content, but is instead configured to retrieve requested content from a database or other repository (not shown) that may not be directly connected to network 120.

Content requestors 110 in general may encompass any device, system or software application that may be configured to request online content. For example, a requestor 110 may include a general purpose computing system configured to implement a web browser such as a version of Microsoft™ Internet Explorer™, Firefox, Opera™, or another suitable web browser or client application. Requestor 110 may also include functionality defined by scripts, such as JavaScript modules, configured to execute in a standalone environment or an execution environment provided by a web browser. Requestor 110 may alternatively be configured to host a syndicated content aggregator that may use a publish/subscribe protocol such as RSS to notify users of the existence of new or updated online content. In some embodiments, a requestor 110 may include mobile devices such as cellular phone or wireless devices configured to request online content via embedded clients. A requestor 110 may further encompass other types of network-attached devices such as television set-top boxes, digital video recorders, etc.

Network(s) 120 may include any suitable data network or combination of networks configured for communicating content requests and online content between requestors 110 and hosts 100. For example, network 120 may include one or more Local Area Networks (LANs) such as Ethernet networks, as well as Wide Area Networks (WANs), Metropolitan Area Networks (MANs), or other data or telecommunication networks implemented over any suitable medium, such as electrical or optical cable; or via any suitable wireless standard such as IEEE 802.11 ("Wi-Fi"), IEEE 802.16 ("WiMax"), etc. In various embodiments, all or a portion of network 120 may encompass the network infrastructure commonly referred to as the Internet. In other embodiments, network 120 may be entirely contained within an enterprise and not directly accessible from the Internet. For example, network 120 may be configured as an enterprise intranet where hosts 100 and requestors 110 are local to an enterprise.

While online content hosted by hosts 100 may often conform to a web-based model in which content may be requested via URLs and delivered to a web browser or other web client, this is not a requirement for the methods and techniques described below. Broadly speaking, hosts 100 may host any type of online content and may interact with requestors 110 according to any suitable request/response model to provide the hosted content. For example, in some embodiments, hosts 100 may be configured as databases, file systems, or other types of data repositories accessible by protocols other than web-based protocols.

Content Request Traffic Data Collection

As described above, a host 100 may receive content request traffic from various requestors 110 that is directed to online content hosted by host 100. For example, a host 100 may receive HTTP GET requests directed to a particular URL, or a different type of content request according to a different data transport protocol. In the illustrated embodiment, hosts 100 may be instrumented with traffic reporting logic 160, which in various embodiments may include scripts, code or hard-wired logic configured to report content request traffic to interest analysis system 130.

Figure 2:
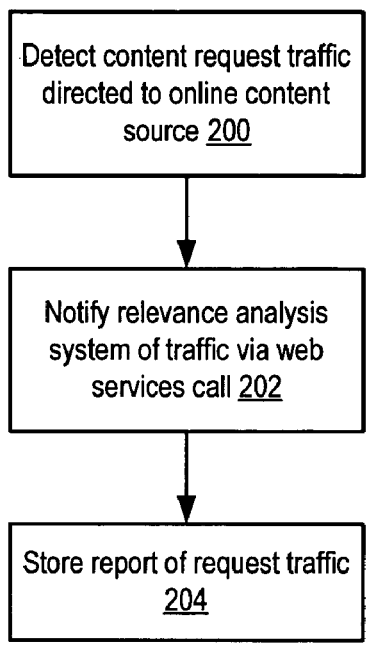
FIG. 2 is a flow diagram illustrating one embodiment of a method of reporting an occurrence of content request traffic via a web services interface.

In one embodiment, traffic reporting logic 160 may be configured to invoke one or more web services (WS) calls targeting the WS interface 140 of IA system 130 as the service endpoint. One embodiment of a method of operation of traffic reporting logic 160 is illustrated in FIG. 2. Referring collectively to FIGS. 1-2, operation begins in block 200 where content request traffic directed to online content sourced by host 100 is detected. For example, host 100 may detect an incoming HTTP GET request specifying a given URL. In response, IA system 130 may be notified of the content request traffic via a web services call (block 202) and the reported request traffic may be stored (block 204). For example, traffic reporting logic 160 may be configured to issue a web services call according to the following format:

http://<endpoint>/xml?Operation=AddPheromone
    &Url=<valid URL>
    &Referrer1=<valid referrer URL>
    &Referrer2=<valid referrer URL>
    &ResponseType=<valid response type> where <endpoint> corresponds to the Internet address of WS interface 140, in name or numeric form, and where <valid URL> denotes the requested or targeted URL. In the illustrated embodiment, two referrer URLs may also be supplied. The first referrer URL may correspond to the URL from which the request for the targeted URL originated. For example, the request may have been generated by a user selecting (e.g., clicking) a link or otherwise executing a navigation operation on some other web page, in which case the first referrer URL may include the URL of that other web page. Similarly, the second referrer URL may include the URL of the site, page or other resource that referred to the first referrer URL (e.g., the URL that is two links previous to the targeted URL in the navigation history of the requestor). More or fewer referrers may be provided in various embodiments. Also, additional or different parameters may be used in the web services call in various embodiments. For example, date and/or time information associated with the occurrence of the content request may be embedded within the web services call used to report the content request. Alternatively, such information may be recorded by IA system 130 when it receives such a report.

It is noted that in some embodiments, when a user navigates away from content on a particular host 100 to a different content source (e.g., a URL hosted by a different host 100), the particular host 100 may be configured to detect the outgoing transition. In some such embodiments, hosts 100 may be configured to report such outgoing content request traffic via traffic reporting logic 160 in addition to incoming content request traffic. Since navigation away from one content source typically implies navigation towards another, even if the target host is not instrumented to report content request traffic data (e.g., with an instance of traffic reporting logic 160), in some circumstances content request traffic data may still be captured by the host that is navigated away from.

In the example web services call shown above, the specified operation AddPheromone may indicate to IA system 130 that the supplied content request traffic information should be recorded and processed as described in greater detail below. Generally speaking, recording information regarding the navigational path taken by a user to a content source (e.g., the target URL as well as its referrers) may be conceptually similar to an insect marking its path with a pheromone. If a sufficient number of users navigate to a particular content source through a certain set of paths, those paths may be distinguished from other paths (e.g., random paths) via the accumulation of "pheromone" (e.g., recorded traffic information). It is noted, however, that the use of the term "pheromone" in this context is purely illustrative or metaphorical and that some characteristics of biological pheromones may not be directly applicable to analysis of content request traffic as described herein.

The additional parameter ResponseType may be used in some embodiments to return data to host 100 from IA system 130. For example, different values for the ResponseType may cause IA system 130 to return data such as the top URLs referring to or from the target URL or the top URLs of all URLs known to IA system 130 (e.g., ranked according to content request traffic analysis as described below). Other ResponseType values may cause the original web services request to be echoed back to host 100, or may cause a different response or no response at all to be returned. If URL data is returned, it may be processed by host 100 as described below in conjunction with the description of FIG. 9.

It is noted that in various embodiments, traffic reporting logic 160 may be configured to invoke WS interface 140 in any of a number of suitable ways. The example just given may be representative of a web services invocation in a Representational State Transfer (REST)-style web services architecture. Alternatively, host 100 may communicate with WS interface 140 using a document- or message-oriented architecture, for example by formatting the web services request as an eXtensible Markup Language (XML) document, encapsulating such a document using a version of the Simple Object Access Protocol (SOAP), and conveying the resulting encapsulated document to WS interface 140 for processing. In either case, different numbers or types of parameters for communicating information about content request traffic targeting host 100 may be employed in various embodiments. It is also contemplated that in some embodiments, hosts 100 may communicate with interface 140 using protocols other than web services-related protocols. For example, such communication may take place using protocols such as Telnet, Remote Procedure Call (RPC), or other standard or proprietary protocols. Also, in some embodiments it is contemplated that a host 100 may combine and report information for multiple distinct content requests as part of a single web services transaction with WS interface 140.

An administrator of a host 100 may integrate traffic reporting logic 160 directly within the other functionality of host 100 that is configured to process content requests and provide content. However, in some embodiments, traffic reporting logic 160 may be configured as a self-contained, platform-independent software module that may be downloaded, remotely invoked or otherwise obtained from a third party (e.g., the party providing IA system 130) and implemented by an administrator of a host 100 with minimal alteration to the configuration of host 100. For example, traffic reporting logic 160 may be implemented as a JavaScript module or a software module coded in another suitable language. Upon activation, traffic reporting logic 160 may be configured to generate the appropriate web services calls to report content request traffic to IA system 130 in a manner that is generally transparent to the other operations performed by host 100. Traffic reporting logic 160 may be implemented to have minimal impact on content request throughput. For example, if traffic reporting logic 160 cannot contact WS interface 140 to report a particular content request, the request may still be allowed to complete.

Although in some embodiments, traffic reporting logic 160 may execute on host 100, in other embodiments it may be implemented as a module such as a JavaScript module that is delivered by host 100 to a requestor 110 along with the requested content. Traffic reporting logic 160 may then be executed by the requesting client, rather than the host, in order to report the request. In other embodiments, traffic reporting logic 160 may be implemented on a proxy server that may be located between requestor 110 and host 100. The general function of traffic reporting logic 160 may be similar regardless of whether the logic is implemented for host-side, client-side or proxy server execution.

Through the reporting of instances of content request traffic by hosts 100, IA system 130 may gather data indicative of both the global traffic behavior among hosts 100 as well as traffic behavior relative to a subset of hosts 100 or within an individual host 100 (e.g., among the different URLs hosted by a particular host 100). In some embodiments, IA system 130 may store each traffic report received from a host 100 as an individual data record, while in other embodiments IA system 130 may be configured to aggregate or consolidate traffic records in various ways. For example, IA system 130 may aggregate content request traffic data into time slots according to intervals of time such as seconds, minutes, hours, days or other suitable intervals. Those data points falling within a given time slot may be aggregated for the purposes of analysis.

Similarly, in various embodiments IA system 130 may manipulate the received URLs within content request traffic data in various ways. For example, IA system 130 may be configured to strip query parameters, session information, or any other potentially personally identifying information such as cookies, passwords, etc. from a target URL or a referrer URL (e.g., by stripping any information following the first occurrence of '?' within the URL). IA system 130 may also be configured to transform URLs into a canonical format, for example by truncating them or eliminating internal levels of hierarchy. Additionally, IA system 130 may be configured to perform unification of different URLs. In one embodiment, certain different URLs may refer to content that is sufficiently similar to warrant tracking as a single content source. For example, a host 100 may be configured to dynamically generate content by augmenting existing content with personalization information before delivering the content to the requestor 110. Alternatively, a URL may reflect session or state information associated with a particular requestor 110 that may be transparent with respect to the content actually delivered to the requestor. Unification of distinct URLs may include determining that the URLs refer to the same underlying content or subset of content, and subsequently tracking the URLs as common rather than distinct. It is contemplated that in some embodiments, some or all aggregation, unification or other manipulation of reported URLs may be performed by traffic reporting logic 160 within a host 100 rather than by IA system 130. Further, it is contemplated that content request traffic reporting, aggregation and analysis may be performed at any suitable level of content granularity. For example, where content sources corresponding to various URLs, reporting and/or analysis may be performed on the level of individual web page URLs, site URLs, or any other suitable portion of a URL obtainable by extraction, truncation, unification, or any other type of transformation.

In some embodiments, reports of content request traffic may be filtered according to various criteria before further analysis occurs (e.g., a rate of change analysis as described below). For example, in some circumstances a requestor 110 may attempt to deliberately manipulate the traffic associated with a given content source by issuing spurious requests to that source. Such manipulation may be detected in a number of ways. For example, a unique identifier associated with a requestor 110 such as its Internet Protocol (IP) addresses or another suitable identifier (e.g., an irreversible hash of an IP address, browser key or other suitable combination of requestor information) may be tracked, and requests to a content source in excess of a given threshold or pattern may be considered questionable and subsequently filtered. Alternatively, collected traffic data may be filtered to remove traffic received from or directed to potentially objectionable sources, such as sources of pornographic content, phishing sites, spamming sites, or other sources complicit or implicit in the delivery of malicious or undesirable software (e.g., spyware or adware). Other motivations for filtering content request traffic are possible and contemplated.

Criteria for determining when filtering should be performed may vary in various embodiments. For example, as mentioned above, a substantial number of content requests originating from a single requestor 110 during a given period of time may be indicative that such requests are possibly being automatically generated. If such requests are directed to one or a small number of content sources, this behavior may be suggestive of an attempt to manipulate content interest indications of those sources. More generally, certain patterns of content request traffic may be identified to be suspicious or manipulative. For example, if content request traffic directed to a content source from one or more requestors 110 is highly cyclical or exhibits other predictable behavior with less variation than would be expected from a stochastic process, the traffic may be considered to exhibit a manipulative pattern and therefore be a candidate for filtering. It is noted that filtering may be implemented as a heuristic process rather than a deterministic process. Accordingly, in some embodiments, filtering may include flagging, marking or otherwise indicating suspicious data instead of permanently removing the data. In such embodiments, whether or not to use suspicious data may be selected as an operating parameter (e.g., by specifying a desired confidence level in the content interest weights).

The actual filtering of content request traffic may occur at a number of different points between requestor 110 and IA system 130. For example, IA system 130 may be configured to store all content request traffic reports received from hosts 100 as such reports arrive, and to subsequently remove records of reports deemed to be spurious or from undesirable sources. Alternatively, IA system 130 may be configured to perform filtering as reports are received and to discard or flag questionable reports. In other embodiments, traffic reporting logic 160 may be configured to evaluate content requests for filtering, and may either discard a questionable request without reporting it to IA system 130 or may report it with prejudice, e.g., by explicitly indicating that it may be questionable. In some embodiments, different criteria for filtering content request traffic may be applied to different content sources according to parameters specified by users of content request traffic data (including the interest analysis procedures described below). In such embodiments, raw content request traffic may be filtered at the time it is retrieved or analyzed rather than when it is initially received or stored.

In one embodiment, IA system 130 may be configured to perform load shedding under certain circumstances. For example, if the combination of incoming reports of content request traffic data from hosts 100 and outgoing content interest data (e.g., to badges, plugins or other users of content interest data as described below) exceeds a threshold volume of processing activity, the performance (e.g., response time) of IA system 130 may degrade. In such circumstances, IA system 130 may be configured to reduce its processing load by discarding incoming reports in order to preserve performance with respect to outgoing data, or vice versa. In other embodiments, other load management schemes are possible and contemplated. For example, IA system 130 may be configured to offload some of its processing tasks to other systems, or may employ flow-control protocols to negotiate the frequency or quantity of reporting it receives from hosts 100.

IA system 130 may be configured to store received content request traffic data using any suitable format or methodology. For example, IA system 130 may store such data in arrays, tables, trees, databases, hashed structures or other suitable data structures, either internal to IA system 130 or distributed among one or several external systems (not shown) such as database systems, file systems, etc. In some embodiments, IA system 130 may store historical content request traffic data for arbitrary periods of time, while in other embodiments data older than a threshold age (e.g., days, months, etc.) may be automatically purged or moved to secondary storage.

Content Request Traffic Data Analysis

The content request traffic data collected by IA system 130 for URLs hosted by a given host 100 may be generally representative of request traffic behavior over time for the given host 100. For example, the collected data may form a time series of data points corresponding to content request traffic at discrete points in time, or during various intervals of time. In some embodiments, IA system 130 may be configured to use curve-fitting techniques to develop an analytical function that is generally descriptive of the collected data within a certain level of error (e.g., by determining coefficients of a power series or Fourier series, or applying any other suitable curve-fitting technique). In such embodiments, parameters characterizing the analytical function (e.g., polynomial coefficients) may be stored in place of the collected data points themselves.

As mentioned previously, in some circumstances the magnitude of content request traffic corresponding to a particular URL may not be an optimal indication of the interest level of that URL. Rather, the rate of change in content request traffic may be a more effective measure for detecting emerging or developing trends in actual online content usage behavior, from which changes in content interest may be inferred. Particular examples of content request traffic data illustrating this phenomenon are shown in FIGS. 3A-B.

Figure 3A:
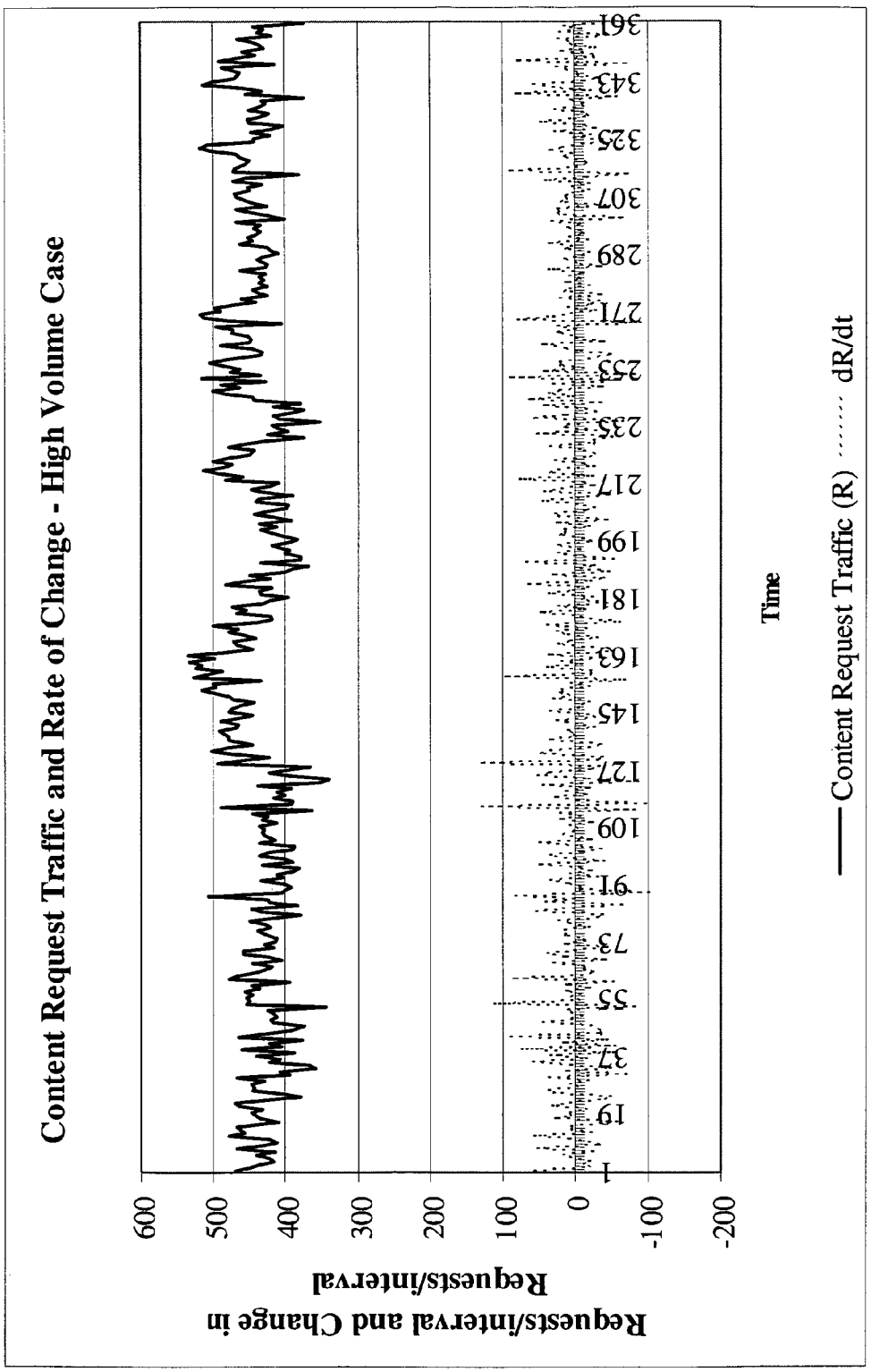
FIGS. 3A-D are graphs illustrating exemplary sets of time-series content request traffic data for contrasting content access traffic volume scenarios.

In FIG. 3A, content request traffic over a period of time is illustrated for an exemplary content source having a relatively high volume of requests. For example, the illustration may apply to a content source corresponding to a large, popular website, such as a retail website. As shown by the heavy solid line, content request traffic R for the high-volume source ranges between approximately 350 and 550 requests during any given interval of measurement. FIG. 3A also illustrates the first time derivative of content request traffic, dR/dt. As shown by the dotted line, the time rate of change of content request traffic generally falls within a range of +100 to −100 requests per unit of time.

Figure 3B:
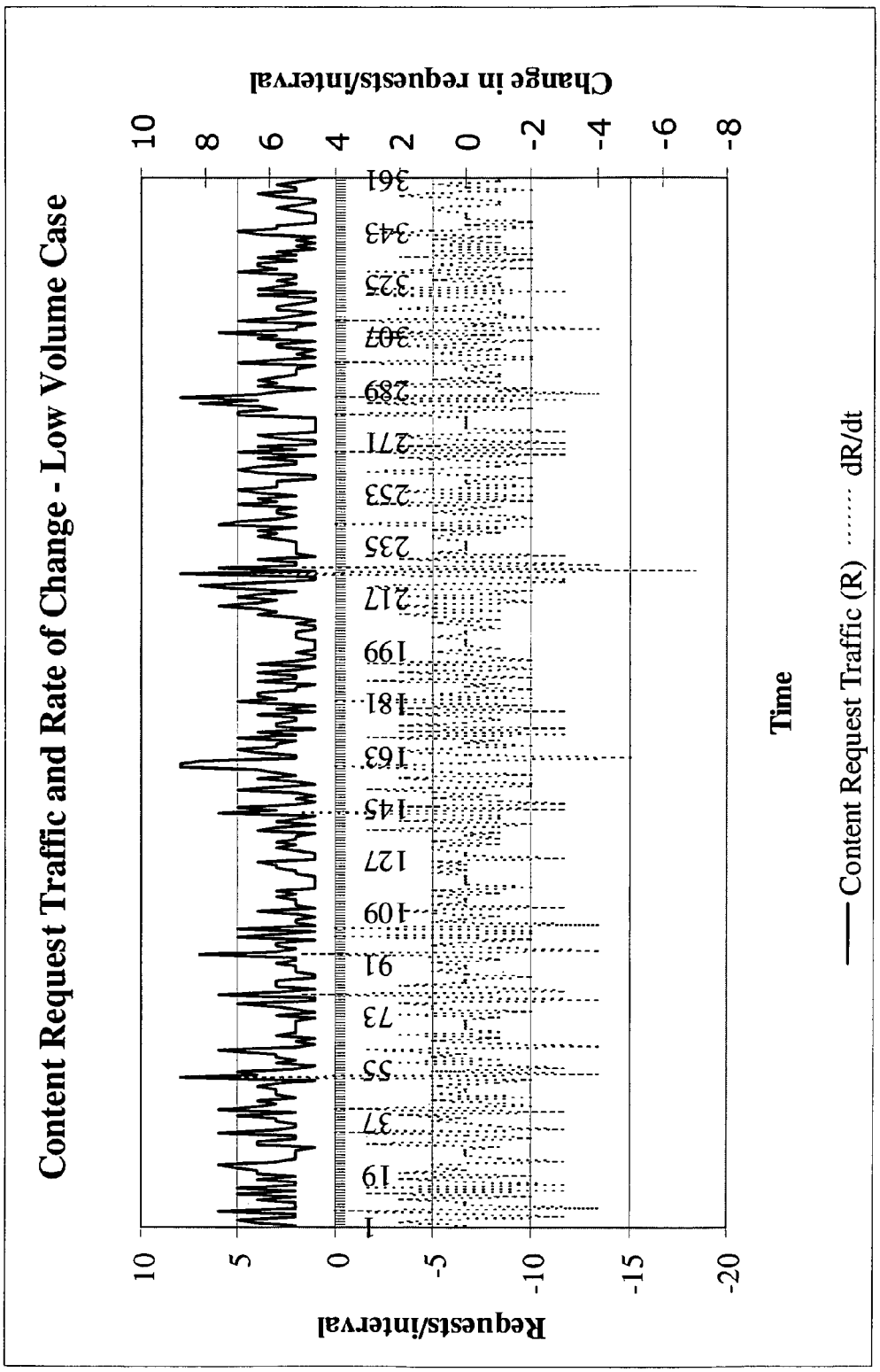

In FIG. 3B, content request traffic R is illustrated for an exemplary content source having a relatively low volume of requests. For example, this case may apply to a personal website such as a blog or personal home page. In this graph, the heavy solid line indicates content request traffic. Read along the left axis, content request traffic falls between 1 and 8 requests during any given interval. The first derivative of content request traffic, shown by the dotted line and read along the right axis, falls within a range of +7 to −7 requests per unit of time.

Figure 3C:
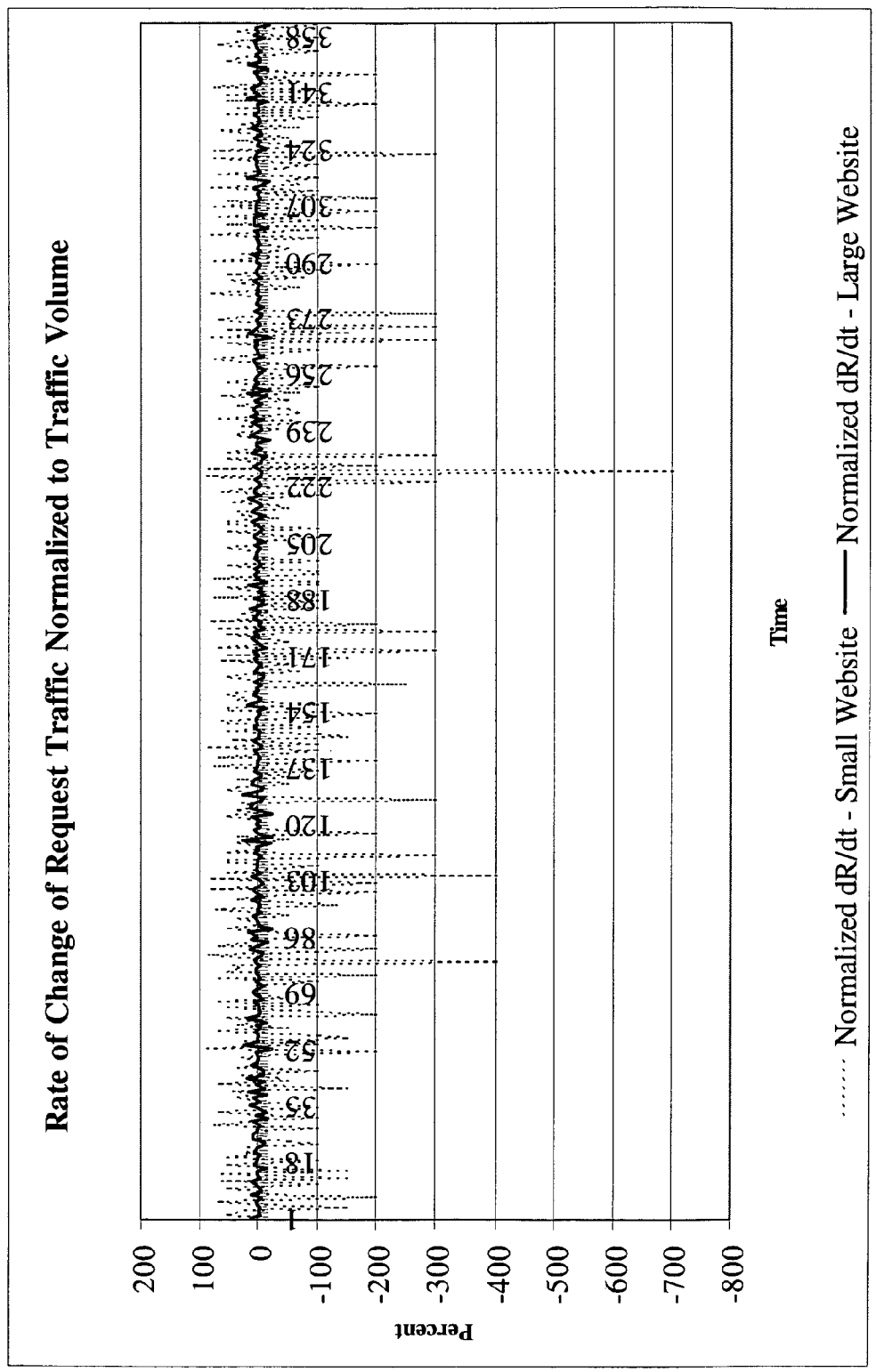

It is noted that in the low-volume case, the rate of change of content request traffic is much larger relative to overall traffic than in the high-volume case. This is explicitly illustrated in FIG. 3C, where the ratio of the first derivative of content request traffic to overall content request traffic and multiplied by 100 is shown for both the low- and high-volume cases. As shown in FIG. 3C, the normalized rate of change of traffic of the high-volume source illustrated by the solid line falls within a fairly narrow range of approximately +/−25% of traffic volume, whereas for the low-volume source illustrated by the dotted line, the normalized rate of change ranges from approximately +100% to −700% of traffic volume. Thus, in this example, even though the high-volume source experiences orders of magnitude more traffic than the low-volume source, the variability of traffic for the low-volume source is orders of magnitude larger than the high-volume case. In some circumstances, this variability may be indicative of changes in interest with respect to the low-volume content source that may be more significant than changes in interest for the high-volume content source.

Figure 4:
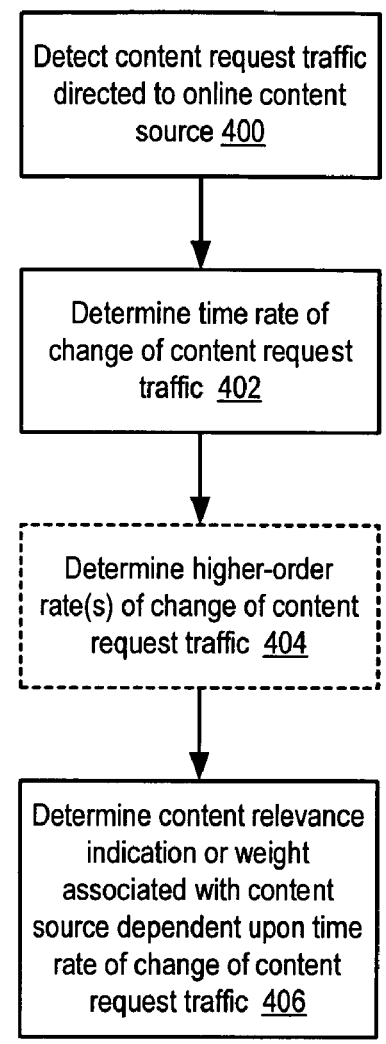
FIG. 4 is a flow diagram illustrating one embodiment of a method of determining an interest weight of a content source according to a rate of change of content request traffic directed to the content source.

In one embodiment, traffic analysis engine 150 may be configured to perform a time rate of change analysis of content request traffic data and to determine the interest of content dependent upon such an analysis. One embodiment of a method of operation of TA engine 150 is illustrated in FIG. 4. Referring collectively to FIGS. 1-4, operation begins in block 400 where content request traffic directed to a content source is detected. It is noted that in one embodiment, detection of content request traffic may be considered to occur when a report of content request traffic is received for analysis by IA system 130. For example, such a detection may occur when IA system 130 receives a report of content request traffic to a URL hosted by a host 100, such as via WS interface 140 as described above. In other embodiments, detection of content request traffic may be considered to occur when host 100 detects a content request or when host 100 submits a report of a request to IA system 130.

A first-order time rate of change of content request traffic may then be determined (block 402). For example, TA engine 150 may be configured to numerically compute the first derivative or first-order difference function with respect to time of the time series of data representative of the content request traffic data. In embodiments in which traffic data is modeled using analytic curve-fitting techniques, determination of the time rate of change of request traffic may be performed using analytic differentiation of the continuous or discrete analytic functions comprising the data model. In some embodiments, the time rate of change of content request traffic may be determined only with respect to newly received traffic data, which may then be appended to historical time rate of change data that may be stored in a manner similar to the content request traffic data itself. It is noted that in various embodiments, time rate of change information may be determined whenever content request traffic is detected, at points in time independent of traffic detection (e.g., according to a schedule), or in response to other events.

In addition to or instead of determining a first-order rate of change as in block 402, higher-order rates of change may be determined with respect to content request traffic data (block 404). For example, a second-order derivative or difference function, indicative of the time rate of change of the first-order time rate of change computed in the previous step, may also be determined in a similar manner. This process may be extended to generate an arbitrary number of higher-order derivatives or difference functions with respect to content request traffic data. Generally speaking, any rate of change of content request traffic determined with respect to time may be considered a time rate of change, regardless of the mathematical order of the rate of change with respect to content request traffic.

Subsequently, an indication of content interest associated with the content source may be determined, where the indication is dependent upon the time rate of change of content request traffic directed to the content source (block 406). The indication of content interest associated with a given content source may also be referred to herein as a weight or interest weight associated with the given content source. As described in greater detail below, in different embodiments, a weight associated with a content source may be determined dependent upon a time rate of change of content request traffic directed to that source in a number of different ways, employing techniques such as normalization, damping, hysteresis, or other types of transformations influenced by the time rate of change of content request traffic. In some embodiments, multiple different weights may be determined that may be associated with different interest contexts, as described below. Additionally, it is noted that IA system 130 may be configured to perform the method of FIG. 4 for the respective content request traffic corresponding to numerous different content sources. For example, IA system 130 may implement multiple processing threads configured to concurrently process traffic data for different content sources, or may process such data sequentially or in a time-multiplexed fashion.

In one embodiment, the first-order time rate of change of content request traffic associated with a content source may be used directly as the weight of the content source. Thus, for example, when traffic to a content source is increasing at a rate of 1 request per second or decreasing at a rate of 0.5 requests per second, its weight may be 1.0 or −0.5, respectively. In variations of such an embodiment, the rate of change may be normalized to fall within a particular range (e.g., between −1 and 1) according to a fixed standard of normalization or relative to rates of traffic change exhibited by other content sources. In some instances, distinguishing positive rates of change may be considered more significant than distinguishing negative rates of change. For example, if a limited number of content sources are selected to be highlighted or displayed in some fashion on the basis of rate-of-change-related weighting, as described in greater detail below, few if any sources with negative rates of change may typically be selected. In some such cases, rates of change that are less than zero may be represented with a weight of zero rather than a negative weight.

As described above with respect to FIG. 3C, in some embodiments, a rate of change of content request traffic may be normalized relative to the request traffic volume from which the rate of change was determined, for example by computing a ratio of the rate of change of request traffic to request traffic volume. The resulting ratio or normalized rate of change may then be used as the interest weight associated with the content source. In circumstances where there is a substantial disparity between content request traffic volume for two different content sources, such as illustrated in FIGS. 3A-B, such a ratio may more effectively highlight the magnitude of a rate of change in content request traffic relative to the volume of traffic. For example, as discussed above, ordinary fluctuation of traffic directed to a high-volume content source may be larger in absolute terms than an unusual spike in traffic directed to a low-volume content source. However, relative to underlying traffic volume, the ordinary traffic fluctuation of the high-volume source may represent only a small fraction of its total volume, whereas the spike in traffic directed to the low-volume source may represent a large multiple of its total volume, signaling a possibly interesting change in the content interest of the low-volume source.

Figure 5:
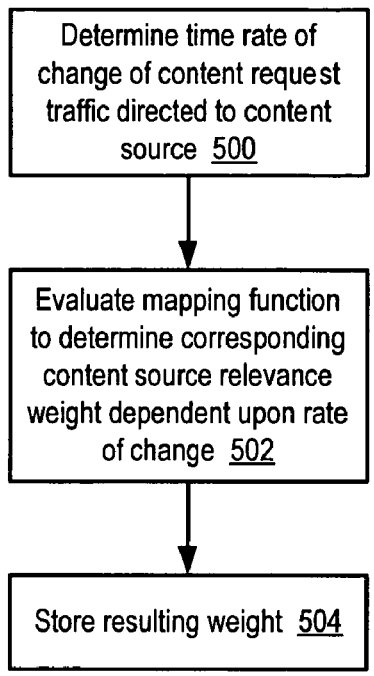
FIG. 5 is a flow diagram illustrating one embodiment of a method of applying a mapping function to map a rate of change of content request traffic to an interest weight of a content source.

The rate of change of content traffic, either in absolute terms or normalized relative to traffic volume, may be mapped to a interest weight using any desired function, such as a linear, polynomial, sigmoidal or other type of function. (A direct mapping of the rate of change or normalized rate of change to the interest weight may be viewed as a mapping using the identity function.) In some embodiments, this mapping may be a stateless mapping that does not take into account a previous value of the rate of change or another variable, such that a change in the value of the rate of change yields some corresponding change in the corresponding weight. One embodiment of a general method of such a mapping is illustrated in FIG. 5. Beginning in block 500, a time rate of change of content request traffic directed to a content source is determined, for example as described above. A mapping function may then be evaluated to determine an indication of interest, or weight, corresponding to the content source, dependent upon the rate of change of content request traffic (block 502). For example, the mapping function may be the identity function or a more complex function. The resulting weight may then be stored (block 504). For example, a weight corresponding to a given URL may be stored in a table, record or other data structure associated with that URL.

In stateless embodiments where positive and negative rates of change directly and immediately influence weights of content sources, the resulting weights may reflect changes in request traffic to content sources in near-real time. That is, the weights may nearly simultaneously reflect actual changes in request traffic as they occur, subject to delays in request traffic being reported from hosts 100 to IA system 130 and then processed. Depending on communication latencies across network 120, in some embodiments weights indicative of request traffic rates of change may lag actual request traffic events by times on the order of seconds or fractions of seconds. Thus, weights may be highly responsive to the state of request traffic.

In other embodiments, a content source weight may be determined on the basis of a rate of change of content request traffic in a manner that preserves some degree of state or history associated with the weight. For example, a host 100 may exhibit a one-time change in content request traffic from a lower constant level to a substantially higher constant level over a brief period of time. Before and after the transition between the initial and final levels in this example, the rate of change of content request traffic may be zero, while during the transition it may be a positive, large quantity. In a stateless implementation, a corresponding interest weight might change (e.g., to zero) following completion of the transition, tracking the rate of change. However, the transition in traffic may hold significance for users for some time after the transition has occurred. For example, the transition may be indicative of an interesting change or development in the information available at the content source, such as breaking news, a new product announcement, etc., and this development may continue to be interesting for some time after it commences.

Generally speaking, a rate of change analysis of content request traffic may detect edges or transitions in such traffic that may be indicative of events that impact content interest. It may be desirable to preserve such events with some degree of persistence beyond the transitions themselves, for example in order to communicate or display the events to other interested parties. For example, a transition in content request traffic may signal a change in content interest that is still pertinent to an observer some time after the change occurs.

Correspondingly, in one embodiment traffic analysis engine 150 may be configured to determine an interest weight of a content source using the current state of the weight in addition to a rate of change of content request traffic. For example, in response to detecting a positive rate of change of content request traffic directed to a content source, TA engine 150 may be configured to correspondingly increase a weight of the content source as a function of the rate of change, as described above. However, if the rate of change should become zero or negative, TA engine 150 may be configured to apply a negative gain or decay function such as a linear, polynomial, exponential or other function to the weight, such that the weight decreases over time by the decay function of the current weight rather than the rate of change of content request traffic.

Figure 6:
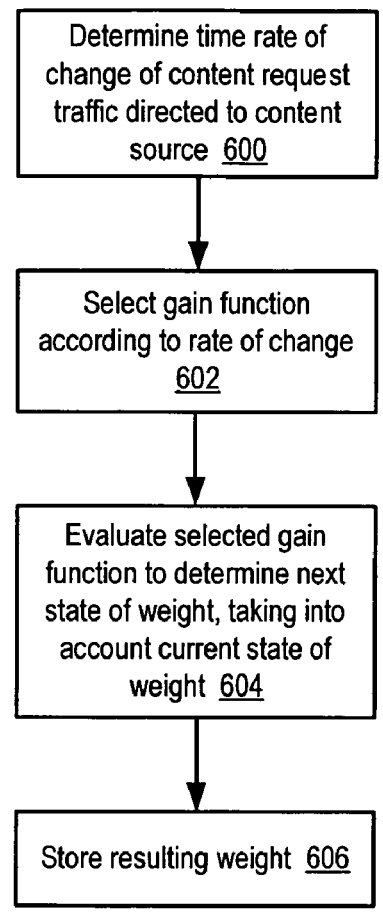
FIG. 6 is a flow diagram illustrating one embodiment of a method of determining an interest weight of a content source using a gain function that takes into account a current state of the interest weight.

One embodiment of a method of determining interest weights for a content source dependent upon a time rate of change of content request traffic data as well as a gain function is illustrated in FIG. 6. Beginning in block 600, a time rate of change of content request traffic directed to a content source is determined, for example as described above. A gain function that takes into account the current state of an interest weight associated with the content source is then selected according to the rate of change (block 602). In some embodiments, TA engine 150 may implement different gain functions according to whether the rate of change is positive, zero, or negative, or whether the rate of change assumes certain specific values. For example, a linear or identity function may be selected if the rate of change is positive, while an exponential or a different linear function may be selected if the rate of change is zero or negative. It is noted that in general, a gain function may operate to either increase or decrease the interest weight to which it is applied, taking into account the current state of the weight.

The selected gain function is then evaluated to determine the next state of the weight (block 604). In some embodiments, the next state of the weight may be selected from either the result of the gain function or the actual value of the content request traffic rate of change. For example, whichever value minimizes the change to the weight may be selected in one embodiment. The resulting weight may then be stored, for example in a table, database, etc. such as described above (block 606).

Figure 3D:
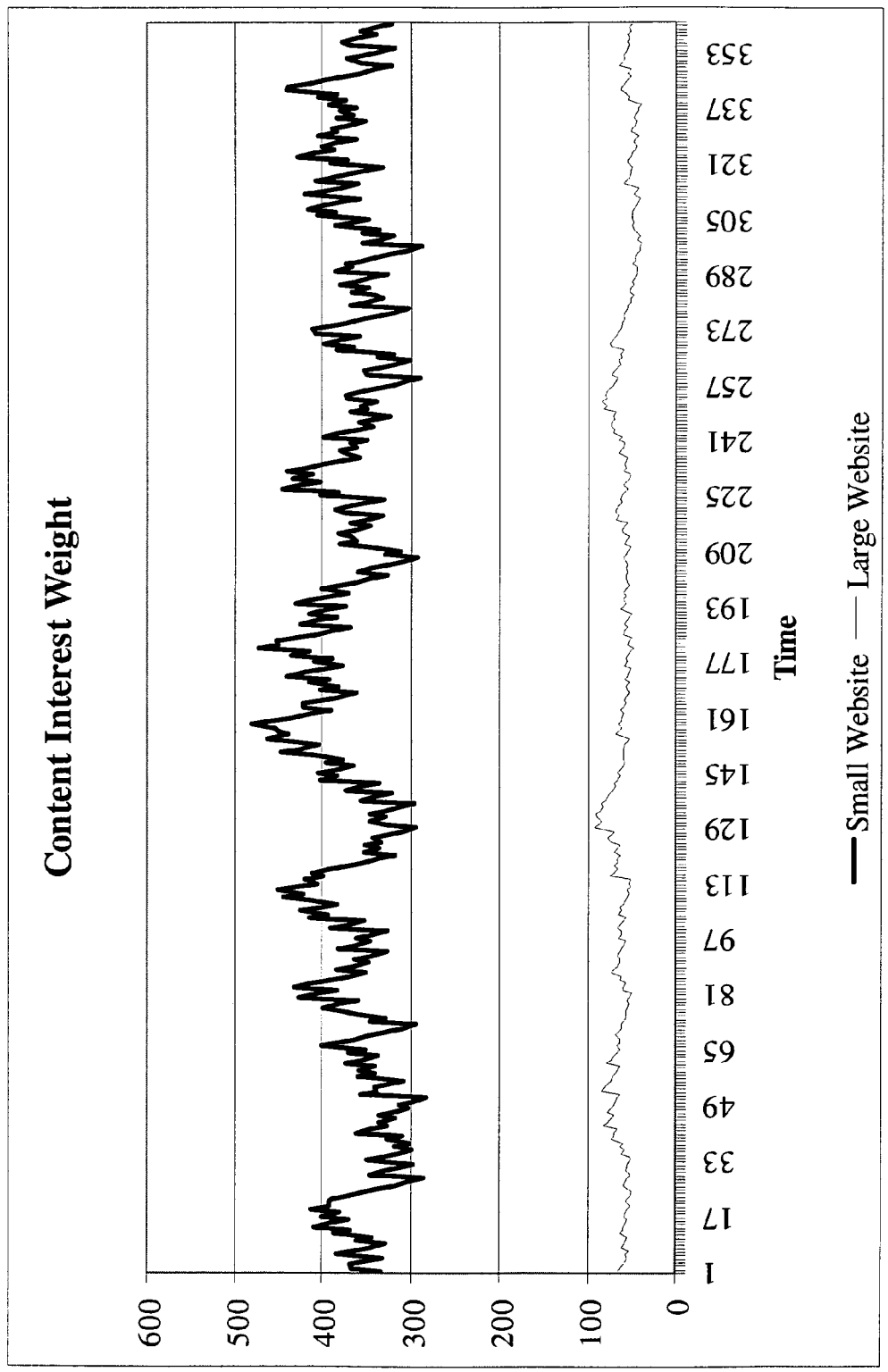

A particular example showing content interest weights derived using a gain function applied to historical content request traffic rate of change data is illustrated in the data plotted in FIG. 3D. In the illustration, the normalized rate of change data shown in FIG. 3C for the high-volume and low-volume content sources has been transformed into content interest weight data through the application of the function:

$$\text{weight}(t) = \max\left(0, 100 \cdot \frac{dR/dt}{R}\right) + 0.95 \cdot \text{weight}(t-1).$$

That is, at any given time t, a corresponding content interest weight for a content source is determined as the normalized rate of change as of time t (which is constrained to be greater than or equal to zero in this case) plus a portion of the content interest weight determined for the immediate prior point in time t−1. In this particular case, the influence of previous weights on the current weight decays according to a ratio, resulting in weights decaying exponentially over time with a decay constant of 0.95. However, as mentioned above, different decay models and parameters may be employed in other embodiments.

It is noted that by applying different gain functions and parameters to rising and falling edges detected in content request traffic (e.g., as indicated by first-order or higher-order rates of change of content request traffic), the responsiveness of an interest weight to different types of fluctuations in request traffic may be selectively tuned to be reactive or "twitchy" in some cases and damped or delayed in others. For example, a weight may be tuned to respond very quickly to increases (e.g., positive edges) in request traffic, but to have a much more gradual decay in response to decreases (e.g., negative edges) in traffic, or vice versa. In particular, it is noted that regardless of how the weight is tuned, it may generally respond to actual fluctuations in content request traffic as they occur, with minimal reporting and processing delays. This behavior stands in contrast to conventional approaches to indexing online content, which generally function independently of actual request traffic (e.g., using web-crawling mechanisms) and thus do not reflect the information implicit in that traffic. That is, conventional indexing approaches may be generally characterized as "pull" models, in which content to be indexed is identified and retrieved, regardless of whether the content is actually interesting as measured by user behavior. As a consequence, conventional approaches may gather and index uninteresting content and overlook potentially interesting content. By contrast, the rate-of-change based content interest model described herein may be generally characterized as a "push" or "demand-driven" model, in which the interest level of a given content source need not be determined if in fact there is no interest in the given source, as indicated by, e.g., an absence of content request traffic data. That is, rather than unconditionally gathering an arbitrary set of data and subsequently determining what part of the gathered data may be interesting, as in the "pull" model, the "push" model may first determine a level of content interest and then perform other functions (such as those described below) for content that is interesting.

Although the interest weight of a content source has been described above as being determined on the basis of a rate of change of content request traffic, optionally also depending on the current weight through a gain function, in some embodiments other factors may also contribute to the interest weight of the content source. For example, a weight determined on the basis of rate of change information as described above may be combined (e.g., in a weighted average) with other measures of interest or relevance such as the volume of request traffic directed to the content source, the number of static links or references to the content source from other sources, or other suitable factors.

Additionally, it is contemplated that other types of time-based analysis of content request traffic data may be performed in some embodiments instead of or in addition to a differential analysis of a rate or rates of change of content request traffic. For example, content request traffic may be integrated over a period of time to determine the basis for normalizing rates of change of content request traffic. Other techniques, such as time-frequency transform techniques (e.g., using an appropriate version of a fast Fourier transform algorithm or discrete Fourier transform algorithm), may also be applied to time-series content request traffic data to transform such time-series data into a frequency domain and thus facilitate extraction of frequency components of the data. Such frequency components may be amplified, filtered or otherwise transformed using frequency-domain techniques. The results may be used to influence the determination of interest weights for the corresponding content source.

Although the foregoing discussion describes embodiments in which interest weights may be determined with respect to individual content sources, it is contemplated that similar techniques may be used to determine interest weights with respect to navigation paths among various content sources. For example, one requestor 110 may generate content access requests directed to a set of content sources A, B and C in that order, while another requestor 110 may generate content access requests to these sources in the order B, A, C. In some embodiments, such navigation paths may be detected through an analysis of the referral and destination information submitted to IA system 130 in a report of a content access request. For example, considering the exemplary AddPheromone web services call discussed above, when the first requestor 110 navigates from content source B to content source C, the AddPheromone call may reflect that the first referrer is content source B and the second referrer is content source A, allowing the path to be reconstructed. In one embodiment, IA system 130 may be configured to detect longer paths by examining reported traffic for instances in which a destination-first referrer combination of one report matches a first referrer-second referrer combination of another report, or vice versa.

In some embodiments, once a navigation path is identified, it may be treated as a locus of interest weight analysis in a manner analogous to that of individual content sources. For example, a navigation path may be treated as a content source in itself, in that request traffic volume along the path as well as rates of change in that traffic volume may be identified. Correspondingly, interest weights may be generated for paths dependent upon determined rates of change of traffic volume along those paths.

Context-Specific Interest Analysis

A rate-of-change-based interest weight of a particular content source, determined as described above, may be generally indicative of the interest of that content source in the context of all content sources for which weights have been obtained. That is, the computed weight may be considered a global indication of interest or a global weight. However, in some embodiments it may be useful to determine more than one weight for a given content source, where the different weights are normalized relative to different contexts. For example, a global weight of a given URL that reflects all request traffic to that URL may be useful in ranking the interest of the given URL in the broad context of all known URLs. However, the interest of the given URL may also be considered within a narrower context, such as those URLs falling within the same top-level domain (e.g., www.domainname.com) or those URLs belonging to some community of interest as described below.

In some instances, a content source that has one weight reflecting interest within a global context may have a considerably different weight reflecting interest within a local context. For example, rate of change data for a given URL may not be particularly noteworthy on a global scale, but might be maximal relative to other URLs within the same domain or other local context. Thus, in some embodiments, TA engine 150 may be configured to determine both a global weight and one or more local weights for a given content source.

Figure 7:
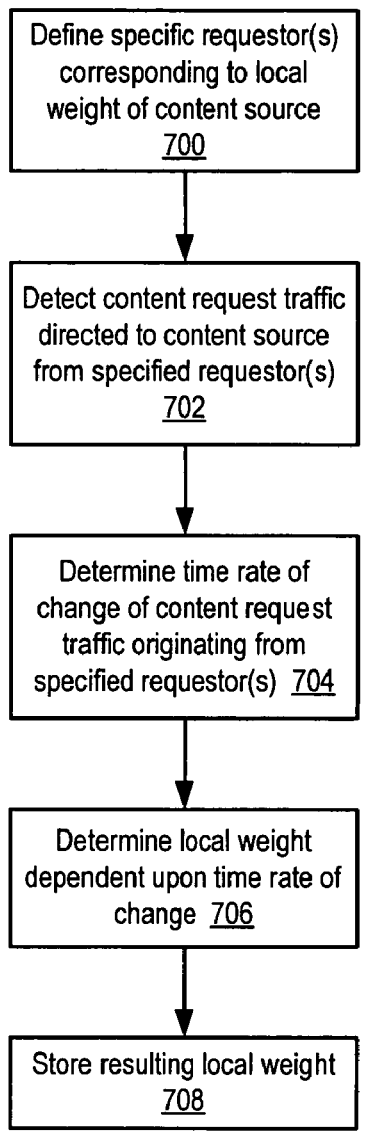
FIG. 7 is a flow diagram illustrating one embodiment of a method of determining a local weight of a content source relative to traffic from one or more content requestors.

Local weights may be determined in different ways according to different embodiments. In the method embodiment illustrated in FIG. 7, a local weight of a content source may be determined relative to a specific requestor or a set of requestors 110. That is, the local weight may reflect a rate of change of content request traffic originating from one or several particular requestors 110, rather than considering traffic from all requestors 110 in the aggregate. In block 700, a specific requestor or set of requestors corresponding to the local weight of the content source is defined. For example, a particular originating URL or domain may be specified. Subsequently, content request traffic directed to the content source from the specified requestor(s) is detected (block 702), for example by TA engine 150 via traffic reporting received via WS interface 140, as described above.

A time rate of change of content request traffic originating from the specified requestor(s) is then determined (block 704) and a local weight may be determined based on the rate of change of content request traffic (block 706). Both rate of change and weight determination may be performed by TA engine 150 in a fashion similar to that of global weights, described above. For example, local weights may track the rate of change in content request traffic in a stateless fashion, or one or more gain functions may be used to shape the response of the local weight to changes in the request traffic behavior. In particular, it is noted that different gain functions may be applied to local weights versus global weights. For example, a global weight of a content source may decay at a different rate than a local weight of that source. Subsequently, the local weight may be stored (block 708), for example as part of a record or table along with a global weight for the content source.

As just described, a local weight of a content source may be determined on the basis of a subset of content request traffic data restricted to specified requestors. In an alternative embodiment, a local weight may also be determined by normalizing global weight information relative to a specified subset of content sources. For example, the global weight of a given content source may be only a fraction of the maximum global weight when all content sources are considered in the aggregate. However, within a particular subset of content sources, such as local context or community of interest comprising a selected number of content sources, the given content source's global weight might be maximal. For example, a global weight of a particular blog may fall well below the median or average global weight of all content sources for which global weights have been determined (e.g., including news sources, retail web sites, etc.). However, considered within a subset of all content sources that includes all blogs, or perhaps all blogs on a particular theme (e.g., politics, parenting, technology, law, etc.) the global weight of the particular blog may rank within the top few content sources of the subset. Deliberately normalizing weights within a specified context may simplify the comparison or ranking of content sources within that context.

Figure 8:
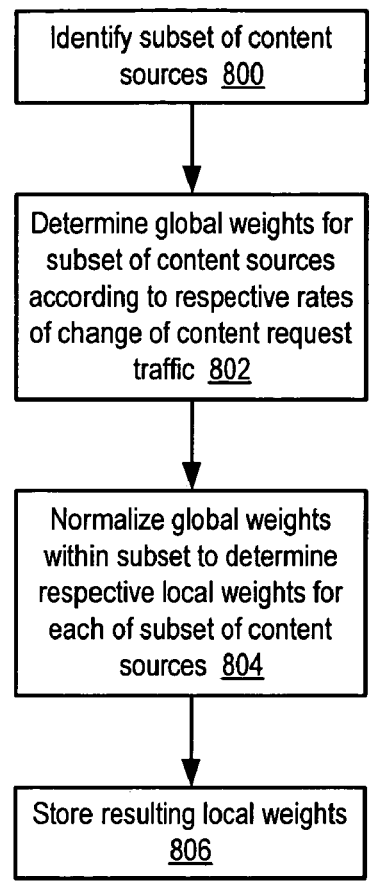
FIG. 8 is a flow diagram illustrating one embodiment of a method of determining a local weight of a content source through normalization relative to a set of content sources.

One embodiment of a method of determining local weights by normalizing global weights relative to a subset of content sources is illustrated in FIG. 8. Beginning in block 800, the subset of content sources is identified. For example, the subset may be defined to TA engine 150 to include all or a portion of the URLs included within a single domain, or a number of URLs across different domains that fall within a community of interest. Subsequently, global weights are determined for each content source according to respective rates of change of content request traffic data (block 802). For example, content request traffic reports may be collected and analyzed to determine global weight information using any of the techniques or methods described above.

Global weight information is then normalized within the specified subset of content sources to determine respective local weights for each source (block 804). For example, the global weights of the subset of content sources may be normalized relative to the maximum global weight or weights within the subset. While such normalization may be linear, in some embodiments the relationships among the resulting local weights may be nonlinear with respect to the original global weights. Subsequently, the resulting local weights may be stored (block 806), as described above.

Different considerations may serve to interrelate different content sources within a particular local context or community of interest for which local weights may be defined. As mentioned above, in one embodiment a local context may correspond to a particular domain, and some or all URLs residing within that domain may be members of the local context with corresponding local weights. In other embodiments, a local context may be defined more generally in terms of content source topography. For example, two URLs may reside within the same local context if they are related by a link or explicit reference from one to the other. More loosely, two URLs may reside within the same local context if their domains are related at any level by a link from one to the other. A local context may be defined more broadly by extending membership to content sources that are related by intermediate links or references, as opposed to direct links.

In other embodiments, membership by content sources in a local context may be determined on the basis of content relationships among the content sources, as opposed to topological relationships. For example, the information content of a given textual content source may be characterized in some embodiments by performing a statistical analysis of words or phrases included within the source and to identify so-called statistically improbable phrases that may be indicative of salient information content. For example, a phrase that occurs frequently in one content source in comparison to others may be indicative of some significant or unique aspect of that content source, as opposed to a generic phrase that may be common to many sources. That is, it may be statistically likely to find common phrases in many content sources, but statistically improbable to find phrases unique to a particular source in many content sources. In one embodiment, two different content sources may be determined to be members of the same local context if their content overlaps to a specified degree, even if they do not explicitly reference or link to one another. For example, two content sources that have a specified absolute number or fraction of statistically improbable phrases in common may have related content, and may consequently be identified as members of a common local context or community of interest.

Other suitable techniques or algorithms may be employed to determine content relationships among content sources, including other types of content such as image data, audio data, metadata or embedded tags, etc., and to identify related content sources as members of a community of interest. For example, metadata tags descriptive of the type and content of different content sources may be compared to determine whether the sources are of similar types (e.g., text, images, etc.) and have similar content, where a measure of similarity between two sources may be proportional to the number of tags those sources have in common, for example. In other embodiments, hashing or other reductive techniques may be used to generate content-dependent signatures of content sources. Depending on the properties of the algorithm used to create the signature, signatures of different content sources may be compared to determine a qualitative or quantitative indication of similarity among the sources.

Additionally, in some embodiments the extent of a local context with respect to content sources may be defined manually. In one embodiment, a user may be provided with a graphical user interface configured to display a topology of interests. For example, the topology may reflect different interests by keywords or phrases and may illustrate relationships among such interests such as hierarchical or set membership relationships, degrees of similarity, etc. Alternatively, the topology may reflect different content sources, illustrating similar relationships. The user may then interact with the interface to specify the categories of interest or the particular content sources to be treated as a local context with respect to content interest weight determination. For example, a user may select individual entities within the topology or may specify groups based on particular relationships (e.g., all entities hierarchically beneath a given entity, all entities removed from a given entity by degree N, etc.). Content sources related to the user's selections may then be associated with a local context for content weight determination as described above. Regardless of the technique used to define a community of interest among content sources (e.g., topological or content-based techniques), a hypothetical content seeker having interest in one content source generally may have a better than random chance of having interest in another content source within the same community of interest.

It is contemplated that in some embodiments, an arbitrary number of local weights may be determined for a given content source using combinations of the techniques described above. For example, a given content source may be a member of multiple different local contexts, with a respective local weight associated with each one.

Content Interest Data Usage and Display

Using the various techniques described above, interest analysis system 130 may operate to generate a wealth of interest information (e.g., interest weights and related data) for various content sources based on content request traffic directed to those sources from requestors 110 and reported by hosts 100. Interest weight information corresponding to content sources may be used in a number of different ways. For example, in some embodiments a conventional search engine may be configured to use a global or local interest weight of a content source to rank the position of that content source in a listing of search results, either instead of or in addition to other methods of ranking search results (e.g., according to the number of static links or references to a given content source, as determined by an indexing process). Specifically, in one embodiment a search operation may be performed over a number of content sources for which corresponding content interest weights have been determined, e.g., by evaluating a set of keywords or a formal query against the content sources. Such a search operation may be performed by a search engine application that is integrated into IA system 130 or separate from it. Those content sources that satisfy the search criteria specified by the search operation may then be ranked according to their respective content interest weights, for example in ascending or descending order according to the values of the weights. However, as described above, in some embodiments interest weight information may be indicative of near-real-time content request traffic activity and may be frequently updated to reflect changes in such activity. Correspondingly, in some embodiments the use or display of interest weights may be configured to take advantage of their near-real-time properties.

Generated content source interest data may be retrieved from IA system 130 according to any suitable technique. For example, in embodiments where IA system 130 is configured to store records, tables or other data structures including interest data, various applications may query IA system 130 via WS interface 140 to retrieve interest data for a particular content source or a number of sources. Such data may include, for example and without limitation, the URLs or other identifiers of the content sources having the highest ranking by global interest weights, the highest ranking requestors 110 submitting requests to the host 100, the highest ranking content sources as destinations for navigation away from host 100, or the highest ranking content sources, ranked by local weights, within any local context or community of interest that may be defined as described above. Lowest-ranking or intermediate ranking content sources in any of these categories may also be the subjects of interest data queries. In various embodiments, the number of content sources for which interest data is returned in response to a request may be fixed or user-selectable. In one embodiment, WS interface 140 may support a limited number of predefined types of interest data queries, while in another embodiment a general-purpose query interface may be provided for processing any desired, well-formed query of interest data.

While in some embodiments, retrieval of interest data may be performed by applications or processes that are independent of requestors 110 and hosts 100, in other embodiments such retrieval may occur by a host 100 as part of the process of reporting content request traffic data. In some cases, retrieving current content source interest data in response to submitting a report of content request traffic data may enable a host 100 to refresh a set of locally pertinent interest data without issuing a separate web services call. For example, in one embodiment a host 100 may be configured to submit a report of a content access request by invoking a web services call, such as the AddPheromone call described above. Depending on the configuration of the web services call (e.g., the argument provided to the ResponseType parameter of the AddPheromone call shown above), when a host 100 submits a report of a content request, WS interface 140 may be configured to return different types of content source interest data.

Figure 9:
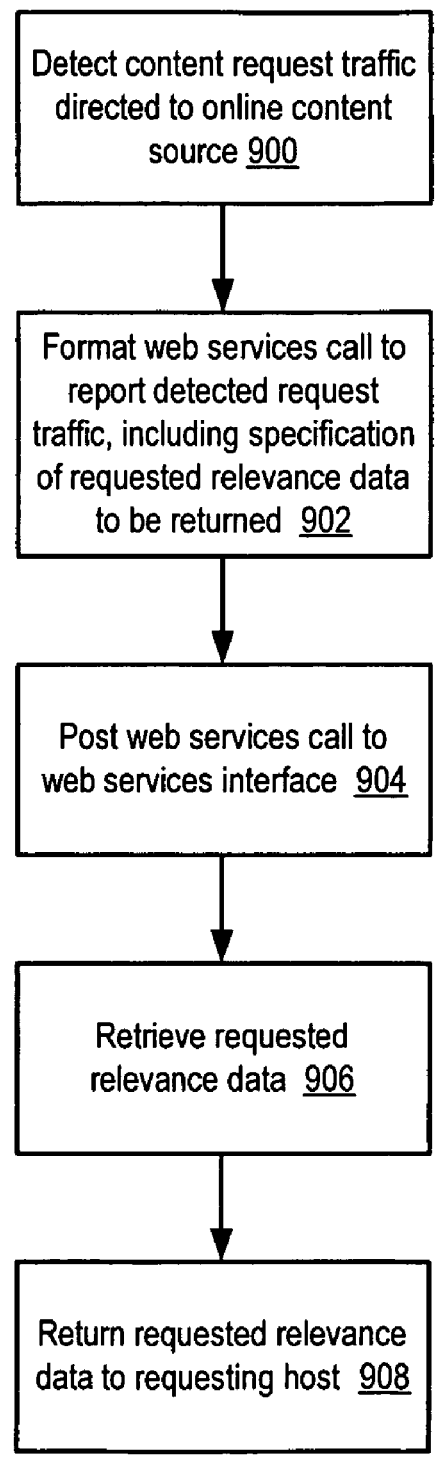
FIG. 9 is a flow diagram illustrating one embodiment of a method of using a single web services call to report content request traffic and retrieve content source interest data.

One embodiment of a general method of using a single web services call to report content request traffic and retrieve content source interest data is illustrated in FIG. 9. Operation begins in block 900 where content request traffic is detected. For example, a host 100 may detect an HTTP GET or other type of content request from a requestor 110. Subsequently, a web services call to report the content request traffic is formatted (block 902). For example, in a REST-style web services architecture, parameters needed to report the traffic may be specified in the form of parameters of an HTTP request to WS interface 140 may be specified, whereas in a document-based web services architecture, a text document including the parameters may be assembled. In this step, the desired content source interest data to be retrieved may be specified. For example, one of a number of arguments to a parameter (e.g., the ResponseType parameter shown above) may be specified in order to identify a particular predefined set of interest data to be returned (e.g., a fixed number of top-ranked content sources according to global weights). In other embodiments, a free-form query for selecting the desired set of interest data may be specified.

The web services call may then be posted to WS interface 140 (block 904) and recorded and analyzed by TA engine 150 as described above. In response, IA system 130 may be configured to retrieve the requested interest data (block 906), performing any necessary query processing or other data selection or filtering specified by the web services call. For example, IA system 130 may select records of content source interest data according to global weights or local weights for a particular local context. Subsequently, the requested interest data may be returned as a result of the web services call (block 908). For example, a formatted document or stream of text containing the requested interest data may be returned to host 100.

Figure 10:
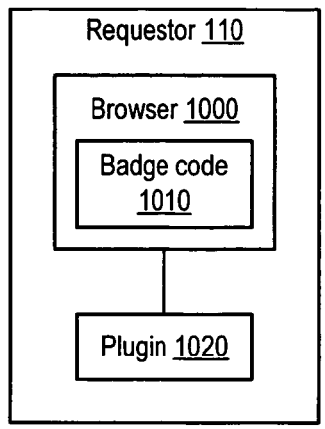
FIG. 10 is a block diagram illustrating one embodiment of a requestor configured to display content source interest data.

Regardless of whether interest data is returned to a host 100 in response to a content request reporting web services call, or returned to a requesting third-party application that is wholly independent of hosts 100 and/or requestors 110, the interest data may be used or displayed in a number of fashions. In one embodiment, as illustrated in FIG. 10, a requestor 110 may be configured to display retrieved interest data to users via a web browser or client. In the illustrated embodiment, requestor 110 is shown to include a web browser 1000 as well as a plugin 1020 configured to interact with browser 1000. Generally speaking, browser 1000 and plugin 1020 may be respective code modules or collections of code modules executable by requestor 110 to provide various functions. In one embodiment, browser 1000 may be any suitable type of browser software capable of retrieving and displaying online content, such as web pages or other content retrieve form a host 100 via a web-based protocol. For example, as mentioned above, browser 1000 may correspond to an instance of Internet Explorer or another specific type of browser.

Plugin 1020 may be a software module that is configured to integrate with and augment the functionality of browser 1000. For example, plugin 1020 may interface with an application programming interface (API) provided by browser 1000 such that plugin 1020 operates as an extension of browser 1000. In some embodiments, plugin 1020 may be selectively downloaded and installed within browser 1000 by a user in order to obtain functionality that may not be natively supported by browser 1000. For example, plugin 1020 may be downloaded by a user from a host 100, from IA system 130, or from another source. As described in greater detail below, in some embodiments plugin 1020 may be executable to display a toolbar or other type of user interface within a display environment managed by browser 1000.

In the illustrated embodiment, browser 1000 additionally includes badge code 1010. As described in greater detail below, badge code 1010 may be executable to display aspects of content interest data within a display environment managed by browser 1000, and/or to perform other functions. In various embodiments, badge code 1010 may be implemented as a JavaScript module, as another type of executable code or script-based module, or as a static image (e.g., represented in Hypertext Markup Language (HTML) or another type of markup language).

Figure 11:
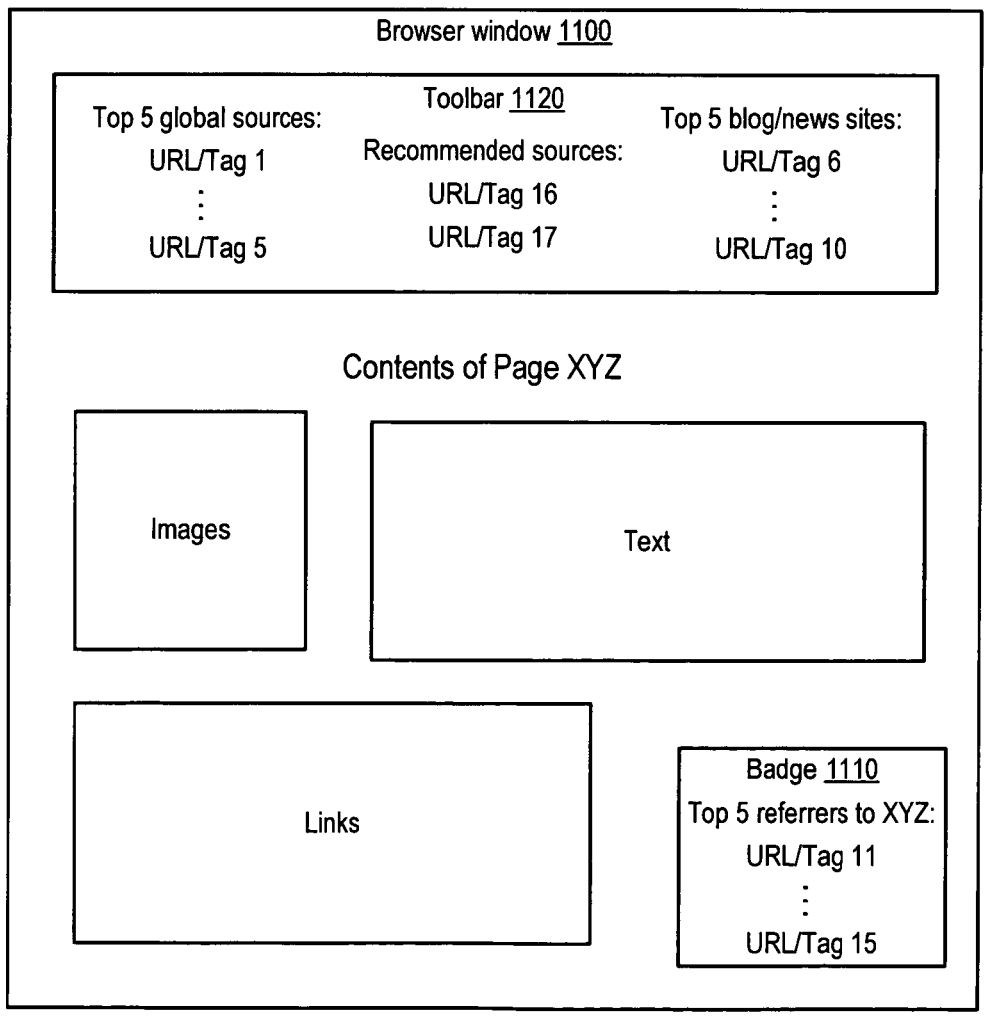
FIG. 11 is a block diagram illustrating several embodiments of browser display objects configured to display content source interest data.

As mentioned above, browser 1000 may be generally executable or operable to generate a display or interface with which a user may interact to request, view and perform other operations with respect to online content. Likewise, badge code 1010 and plugin 1020 may be executable to generate specific displays or interfaces of their own, or to implement other functions not directly associated with the display of content interest data. One example of a collection of displays that may be presented to a user through the collective operation of browser 1000, badge code 1010 and plugin 1020 is illustrated in FIG. 11. In the illustrated embodiment, a browser window 1100 that may be generated and managed by browser 1000 is shown displaying a variety of content that may include text, images, links to other content sources, or any other suitable content arranged in any fashion within window 1100. Additionally, a content interest data display or "badge" 1110 is illustrated within the display area of window 1100. Badge 1110 may be generated through the operation of badge code 1010. Similarly, window 1100 includes a toolbar 1120, which may be generated through the operation of plugin 1020. In the following discussion, a general correspondence between the executable components shown in FIG. 10 and respective display elements shown in FIG. 11 is assumed. However, as noted below, in some embodiments plugin 1020 may partially or completely subsume the functionality of badge code 1010 or vice versa, and in some embodiments the functionality of either or both of plugin 1020 or badge code 1010 may be implemented separately from and without dependence on browser 1000.

Generally speaking, individual instances of badge code 1010 may be associated with respective hosts 100, or content served by hosts 100, and may be displayed in some fashion whenever a user accesses a host 100 for which badge code 1010 has been implemented. Badge code 1010 may be integrated within the code or content of a particular web page served by a host 100 or implemented such that it is downloaded, activated and displayed whenever a user requests any content served by a host 100. In some embodiments, it is contemplated that badge code 1010 may be configured to implement the functions of traffic reporting logic 160 described above, while in other embodiments traffic reporting logic 160 may be implemented as a module distinct from badge code 1010.

Additionally, in some embodiments badge code 1010 may be configured to implement functions for locating or recruiting new sources of content for potential instrumentation with traffic reporting logic 160 and inclusion in content request traffic data collection. In one embodiment, badge code 1010 may be configured to provide a user-selectable interface option, such as a menu item, a clickable link or banner, or another suitable interface through which a user may obtain, install and configure those components (e.g., traffic reporting logic 160 and/or badge code 1010) needed to begin participating in content request traffic reporting. For example, badge 1010 code may be configured to present, e.g., via badge 1110, a selectable banner or menu item displaying a message to the effect of, "click here to install me on your site!" Upon selecting this item, a user may be directed to a site offering instructions and downloadable software that may be used to instrument a host 100.

In another embodiment, badge code 1010 may be configured to examine content request traffic arriving at and departing from its respective host 100 in order to identify a host or domain associated with such traffic. In response to detecting arriving or departing traffic, badge code 1010 may be configured to notify an administrator of the source or destination of such traffic to solicit participation in content request traffic reporting. For example, badge code 1010 may extract a domain name (e.g., domainname.com) from a content access request and may then send an email notification to "webmaster@domainname.com", "admin@domainname.com", or any other typical or well-known administrative address that may be included in a default list of such addresses, where the notification may include instructions regarding how to participate in content request traffic reporting and/or links directing the recipient to a content source including such information. In other embodiments, badge code 1010 may identify candidate content sources for recruitment using other techniques. For example, badge code 1010 may create lists of potential content sources derived from content request traffic directed to its respective host 100. Subsequently, badge code 1010 or other software may be configured to examine or mine prospective content sources to determine administrative contact information (e.g., a preferred contact listed on a web page), the type of content available from the content source, whether the content source is already instrumented with an instance of badge code 1010 and/or traffic reporting logic 160, or other relevant information regarding the prospective source.

In the illustrated embodiment, badge code 1010 is configured to display, via badge 1110, interest weight information and related data associated with its respective host 100 that may be retrieved from IA system 130 as described above. In one embodiment, badge code 1010 may be executable to simply display an ordered list of content sources ranked according to the request that yielded the interest weight information. For example, if the interest data for the most popular global content sources or local content sources within some local context was requested, badge code 1010 may be executable to display all or a given number of those sources ranked from highest to lowest. In badge 1110, a given content source may be identified by a display of its URL, an icon, or a tag, alias or other source name that may be assigned by the content source or specified by the user viewing the display. In some embodiments, badge code 1010 may be executable to provide a user interface that allows a user to customize aspects of the display, for example by specifying the type of query used to retrieve the interest data to display, the amount of data to display (such as the number of content sources), the frequency with which the display data is updated, or other display characteristics such as fonts, colors, styles, etc.

In one embodiment, badge code 1010 may be executable to retrieve and display content interest weight information that is relevant to content request traffic associated with a respective host 100, without taking into account user-specific information, such as navigation history or content preferences of a user interacting with browser window 1100 on a requestor 110. For example, badge code 1010 associated with a given host 100 may be executable to indicate the top content sources among all hosts 100 according to global weight, the top content sources hosted by given host 100 in particular (e.g., specific URLs hosted by given host 100), the top referrers to given host 100, or the top content sources navigated to from given host 100. In some embodiments, it may be desirable to keep the functionality of badge code 1010 relatively lightweight and host-specific. For example, the functionality of badge code 1010 may be confined to a limited feature set of display and analysis options centered on content interest data that is pertinent to a given associated host 100. In some such embodiments, limiting the features and scope of analysis in this way may reduce the code size of badge code 1010 (and consequently, the time required to load content from given host 100) as well as dependence on client-specific aspects of the browser 1000. For example, minimizing the complexity and user interface requirements of badge code 1010 may facilitate the display of badge 1110 within the display environments generated by different types and versions of browsers 1000 and underlying platforms.

In contrast to one embodiment of badge code 1010, plugin 1020 may be configured to perform user-specific personalization of content interest information. In one embodiment, plugin 1020 may be configured as a software module that may be obtained by a user and persistently integrated within browser 1000 or as a standalone software module. As described above and shown in FIG. 11, plugin 1020 may be executable to generate a toolbar 1120 that may be displayed within browser window 1100, for example in a reserved portion of the display area within a browser window or via a browser tab. Alternatively, toolbar 1120 may be displayed separately from window 1100 as a detachable or standalone window. Plugin 1020 may be invoked as an extension to browser 1000. Alternatively, the functionality of plugin 1020 may be implemented as a separate, standalone application that may execute independently of browser 1000 and may generate any suitable type of user interface, including interfaces other than toolbars. In one embodiment, once installed, plugin 1020 may remain active throughout a user's session with a browser 1000. By contrast, in one embodiment, badge code 1010 may remain active only so long as a user is viewing content associated with its respective host 100 via browser window 1100, and may be deactivated if the user navigates away from that host.

Plugin 1020 may be configured to perform a variety of functions related to content interest data on behalf of a user. In one embodiment, plugin 1020 may provide an interface through which a user may specify arbitrarily complex queries of content interest data generated by IA system 130. Such queries may allow a user to track the relative interest of content sources ranked within global or local contexts. As a non-limiting example, plugin 1020 may allow a user to receive visual or textual feedback, e.g., via toolbar 1120, that is indicative of the top five globally-ranked content sources as well as the top five news media stories (e.g., stories from any media site) and the top five sources having any relation to a specified topic, e.g., patent law. As described above, a user may also track relative interest of paths among sources, ranked within either global or local contexts. Plugin 1020 may be executable to provide an interface that enables a user to specify how a given local context is defined, for example by entering various types of metadata or keywords indicative of the local context.

As noted above, interest data may be collected and updated by IA system 130 in near-real time as changes in content request traffic occur among various hosts 100. For example, plugin 1020 may cause the data displayed via toolbar 1120 to be refreshed at regular intervals, e.g., at intervals of five or ten seconds, or upon the request of a user. In some embodiments, plugin 1020 may be configured to highlight the evolution of interest data over time. For example, rather than simply display an ordered list of content sources according to interest data, plugin 1020 may be configured to cause the content sources to be displayed in display formats that are directly influenced by interest data. In one embodiment, the size or color of the text or icon used to display a particular content source within toolbar 1120 may vary as its corresponding interest data changes. For example, if the global weight of a displayed content source increases or decreases over time, the size of the font used to display the name of the content source may correspondingly increase or decrease. In some embodiments, different display characteristics may be used to simultaneously display different aspects of interest data for a given content source. For example, font size may correlate to changes in global interest weights, while font color may correlate to changes in local interest weights. Other uses of display characteristics to convey evolving content source interest data are possible and contemplated. Further detail regarding such uses may be found in co-pending U.S. patent application Ser. No. 11/186,357, filed Jul. 21, 2005 and entitled "Displaying Links at Varying Levels of Prominence to Reveal Emergent Paths Based on User Interaction," the entirety of which is incorporated herein by reference.

One example of a type of content interest data display and its evolution over time is illustrated in FIGS. 12A-D. Such a display may variously be generated by plugin 1020 or badge code 1010 and displayed via toolbar 1120 or badge 1010, respectively. In other embodiments, such a display may be generated and displayed by other components. For example, content interest data may be dynamically displayed by a host 100 as a web page directly accessible by a user via browser 1000, without need of badge code 1010 or plugin 1020.

In one embodiment, the components and techniques described hereinabove may be implemented within a large enterprise that creates and manages a substantial degree of online content in to track content interest weight information, for example as part of an enterprise resource management or knowledge management process. FIGS. 12A-C illustrate the top destinations within the enterprise, ranked according to interest weights determined as described above, at three points in time separated by several minutes. For example, the top-ranked content source varies over this relatively short period of time between several phone directory entries and the "Wiki:Wiki Home" content source (which may correspond to, e.g., an online repository of documentation that may be collaboratively maintained by users.) As shown, the display may include an indication of the interest weight of a particular content source as well as a link or URL associated with the content source. In some embodiments, each link may be an active link, such that a user selecting the link may thereby navigate to the indicated content source. In the illustrated embodiment, two weights are illustrated for each URL. The first weight indicates a total weight, which may be determined as a function of a most recently calculated rate of change of content access request traffic as well as earlier calculated rates of change (e.g., using a decay model as described above with respect to FIG. 3D). The second weight indicates a weight during a most recent interval of time, such as may be determined from a most recently calculated rate of change without accounting for earlier calculated rates of change. In the illustrated embodiment, URLs are ranked according to the total weight. In other embodiments, however, content interest weights may be determined according to different functions of rates of change of content request traffic, and more or fewer weights may be displayed. Further, URLs may be ranked differently (e.g., according to most recent weight instead of total weight).

Additionally, in the illustrated embodiment, each indicated content source includes a "drilldown" link that a user may select to obtain more information regarding the content request traffic associated with a particular content source. One embodiment of a display of such traffic data is illustrated in FIG. 12D. In the illustrated embodiment, content request traffic information is shown for the content source "Wiki: Wiki Home" that appears as the top-ranked destination in the display of FIG. 12C. The drilldown display shows content source and corresponding interest weight information for those content sources that are destinations from the "Wiki: Wiki Home" content source and those content sources that are referrers to the "Wiki:Wiki Home" content source. As shown, users may arrive at this content source from a number of different referral paths, and may proceed to a number of distinct destinations from this content source.

In addition to or instead of generating a graphical or textual display that responds to events relating to content interest data, plugin 1020 may also be configured to support various other types of user notification in response to such events. For example, a user may specify one or more notification criteria, such as a threshold weight of a content source with respect to a global or local context, or some other criteria. If a content source satisfies the notification criteria, plugin 1020 may be configured to notify a user by displaying an alert on a display device (e.g., displaying a dialog box or other type of interface on a computer monitor or other graphical interface that displays browser window 1100), or sending an electronic mail (email) or an instant message (IM) to an email or IM address specified by the user. In other embodiments, plugin 1020 may be configured to place a telephone call or send a text message or numeric page to a device specified by the user. Plugin 1020 may also be configured to generate notifications using a publish-subscribe or syndication protocol such as a version of the RSS (Really Simple Syndication or Rich Site Summary) and to convey such notifications to a browser, news aggregator or other RSS application, which may generally include any application capable of receiving such RSS notifications and acting in response to them, e.g., to display content or convey its own notifications to users.

Plugin 1020 may support other types of user personalization or customization with respect to content interest data. In one embodiment, plugin 1020 may be configured to provide notifications or recommendations of potentially interesting content on the basis of a user's expressed interests, the user's navigation history among content sources, or extrapolation of interest from content sources themselves. For example, a user may provide a list of keywords (e.g., by manually entering keywords, by selecting keywords from a predefined list, etc.) indicative of content types or topics in which the user is particularly interested. Plugin 1020 may use such keywords as a basis for creating local contexts or otherwise filtering content interest data in ways that are likely to detect content of specific interest to the user. Plugin 1020 may also be configured to analyze a navigation path among content sources traversed by a user and, as described above, to identify other possibly interesting content sources that may fall in or along such a path, according to collected content request traffic data. Additionally, plugin 1020 may be configured to extract content-identifying information, such as keywords, content metadata, statistically improbable phrases, or other such information from a content source a user has previously requested (e.g., a web page currently or previously viewed by the user). Plugin 1020 may use such extracted information, or any other information gathered from user navigation or otherwise collected from a user, in conjunction with content interest data to identify and suggest content sources of potential interest to a user. Plugin 1020 may be further configured to display notifications or recommendations regarding potentially interesting content via toolbar 1120 or via any of the notification techniques described above.

As noted above, in some embodiments content interest data may be available for use or display by badge code 1010, plugin 1020 or other software or hardware with minimal delay following content request traffic events that may influence content interest data. That is, content interest data may be available for processing in near-real time relative to the actual occurrence of content request traffic. However, in some embodiments, historical content interest data may also be processed and/or displayed. For example, a user may not be able to view near-real time content interest data for a period of time (e.g., hours or days) owing to other activities. When the user is once again available to view content interest data, he or she may be interested in learning not only what content is currently of possible interest, but what changes in content interest may have transpired during the previous period of time.

In one embodiment, plugin 1020 may include an interface that allows a user to access historical content interest data in various ways. For example, a user may interact with plugin 1020, e.g., via toolbar 1120, to query historical content interest data (e.g., as stored by IA system 130) for any content sources that would have satisfied interest notification criteria over a period of time. In other words, a user may effective apply a set of current notification criteria, intended to notify the user in near-real time as described above should a content source satisfy the criteria, against historical content interest data. In applying such criteria against historical data, plugin 1020 may generate a highlighted display of interesting content for which notification would have occurred, had the user been available to receive it. In another embodiment, rather than retrieve and retroactively analyze historical content interest data from IA system 130, plugin 1020 may be configured to store a history of content interest data, notifications, etc. as they occur over a period of time. For example, in addition to or instead of conveying a notification to a user, plugin 1020 may store a notification (and possibly other data, such as timestamp information) for later review by the user. Plugin 1020 may implement various interface options through which a user may interact with historical content interest data. For example, via toolbar 1120, plugin 1020 may enable a user to scroll the contents of a graphical display (e.g., a plot of a content interest weight) backwards and forwards through historical time to illustrate changes in the data over time. Plugin 1020 may alternatively store a list of content sources (e.g., URLs) identified as interesting, which may be displayed in historical order, in ranked order according to relative level of interest, alphabetically, etc.

It is also contemplated that historical analysis of content interest data may be employed over longer timeframes. In one embodiment, plugin 1020 or other software or hardware may be configured to analyze content interest data over arbitrary periods of days, weeks, months, etc. in order to detect patterns or trends in the data. For example, content interest data may be mined for correlations between changes in interest of a given content source and other factors, such as the type of content of the content source, access behavior of similar or competing content sources, or other emergent trends.

Although embodiments of plugin 1020 and badge code 1010 have been described as having distinct functionality, it is contemplated that in some embodiments badge code 1010 may be configured to implement some or all of the features of plugin 1020, or vice versa. It is further contemplated that functionality for processing and display of content interest data may be implemented using a different partitioning or architecture. For example, various display and notification functions may be divided among different components rather than implemented as a single plugin or badge. In one embodiment, processing and display functionality for content interest data may be built into a website for direct viewing and interaction via browser 1000 without need of plugin 1020 or badge code 1010.

Some applications may process content interest data independently of browser 1000. For example, some of the data mining or other post-processing activities mentioned above may be implemented by one or more standalone applications configured to directly retrieve content interest data from IA system 130 using appropriate web services calls, database queries, or other interface approaches. In one embodiment a search engine may be configured to employ content interest data to rank search results, analogous to the manner in which conventional indications of relevance may be used. For example, a content source having a higher global or local weight may be ranked higher within a set of search results than another content source having a lower global or local weight. As mentioned above, it is contemplated that in some embodiments, content interest data may be used in conjunction with other data, e.g., relevance data, to perform such a ranking.

In one embodiment, an application may be configured to place advertisements within online content dependent upon content interest data. For example, conventional placement of an advertisement within online content may depend upon whether the content matches a keyword profile associated with the advertisement. However, like a conventional measure of relevance described above, such a conventional placement does not take into account rates of change of content request traffic associated with the content in which the advertisement is placed. By contrast, in a system configured to determine content interest weights as described hereinabove, more sophisticated advertising placement may be possible. For example, rather than being statically bound to a given content source, an advertisement may be selectively associated with different content sources as their relative interest changes, such that the advertisement is persistently associated with a content source having at least a threshold level of interest. Additionally, the cost charged for advertising placement may be associated with the desired interest level of the content sources targeted for placement. For example, the highest rates may be charged for placement on content sources having the highest interest weights, either globally or in a local context.

In embodiments where content interest data is computed for navigation paths among content sources (instead of or in addition to traffic directed to a single content source), advertising placement may also be performed dependent upon the interest level of a path navigated by a user. For example, as described above, user navigation among sources may be used to suggest or recommend other content sources of potential interest to the user. Similarly, such navigation path information may be used to determine advertisements that may be particularly compatible with a user's interests. In some embodiments, it is contemplated that content interest data may be used in conjunction with keywords or other content data or metadata to perform advertising placement.

Exemplary Computer System Embodiment

It is contemplated that in some embodiments, any of the methods, techniques or components described above may be implemented as instructions and data capable of being stored or conveyed via a computer-accessible medium. Such methods or techniques may include, for example and without limitation, the various methods of detecting content request traffic, providing content, reporting traffic requests, analyzing content request traffic data to determine global and/or local interest weights, and requesting and displaying interest data as performed by the elements shown in FIGS. 1 and 10 and the methods illustrated in FIGS. 2 and 4-9. Such instructions may be executed to perform a particular computational function, such as processing web services traffic, implementing mathematical functions such as integration, differentiation, convolution, etc., as well as higher-order functions such as, operating system functionality, network communications functionality, application functionality, and/or any other suitable functions.

Figure 13:
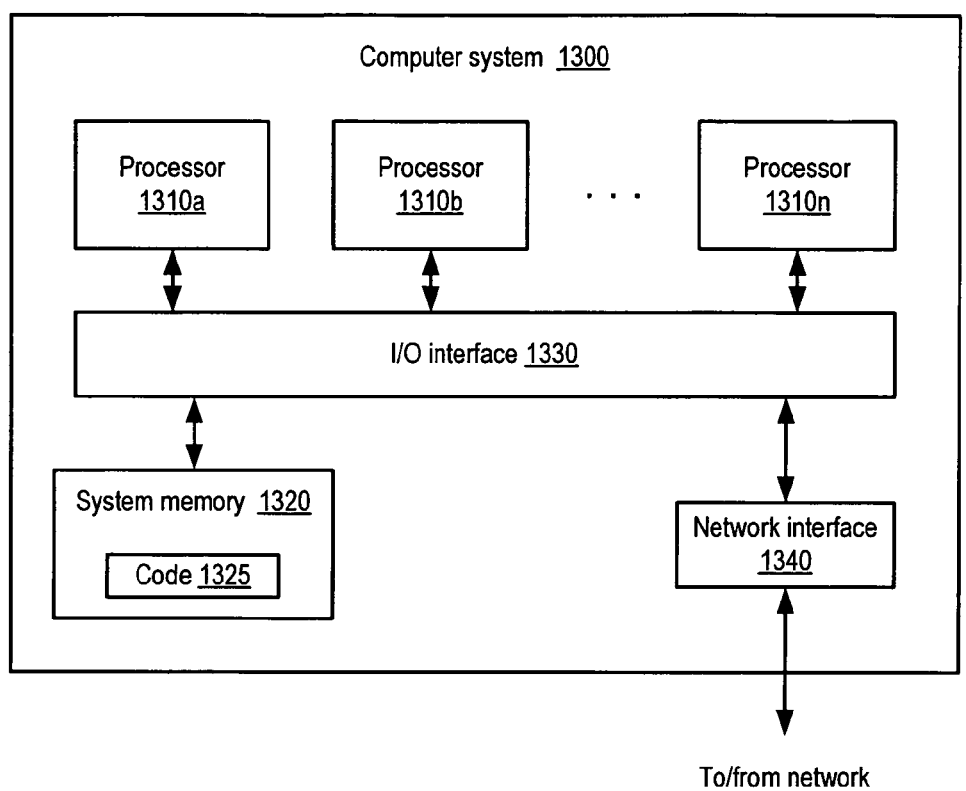
FIG. 13 is a block diagram illustrating an exemplary embodiment of a computer system.

One exemplary embodiment of a computer system including computer-accessible media is illustrated in FIG. 13. In the illustrated embodiment, computer system 1300 includes one or more processors 1310 coupled to a system memory 1320 via an input/output (I/O) interface 1330. Computer system 1300 further includes a network interface 1340 coupled to I/O interface 1330. Computer system 1300 may be illustrative of one embodiment of a host system 100 as well as a system hosting a requestor 110, although the specific configuration of computer system 1300 may vary for different embodiments of these systems. For example, system 1300 may be variously configured as a server system, a desktop or notebook system, an embedded system, a handheld or portable client system, etc.

In various embodiments computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments processors 1310 may be a general-purpose or embedded processor implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

System memory 1320 may be configured to store instructions and data accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, such as those described above, are shown stored within system memory 1320 as code 1325. It is noted that in some embodiments, code 1325 may include instructions and data implementing desired functions that are not directly executable by processor 1310 but are represented or encoded in an abstract form that is translatable to instructions that are directly executable by processor 1310. For example, code 1325 may include instructions specified in an ISA that may be emulated by processor 1310, or by other code 1325 executable on processor 1310. Alternatively, code 1325 may include instructions, procedures or statements implemented in an abstract programming language that may be compiled or interpreted in the course of execution. As non-limiting examples, code 1325 may include code specified in a procedural or object-oriented programming language such as C or C++, a scripting language such as perl, a markup language such as HTML or XML, or any other suitable language.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to network 120, such as other computer systems, for example. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 1320 may be one embodiment of a computer-accessible medium configured to store instructions and data as described above. However, in other embodiments, instructions and/or data may be received, sent or stored upon different types of computer-accessible media. Generally speaking, a computer-accessible medium may include storage media or memory media such as magnetic or optical media, e.g., disk or CD/DVD-ROM coupled to computer system 1300 via I/O interface 1330. A computer-accessible medium may also include any volatile or non-volatile media such as RAM (e.g. SDRAM, DDR SDRAM, RDRAM, SRAM, etc.), ROM, etc, that may be included in some embodiments of computer system 1300 as system memory 1320 or another type of memory. A computer-accessible medium may generally be accessible via transmission media or signals such as electrical, electromagnetic, or digital signals, conveyed via a communication medium such as a network and/or a wireless link, such as may be implemented via network interface 1340.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
one or more processors and a memory configured to store instructions, wherein the instructions are executable by the one or more processors to implement:
a web browser; and
a badge code module configured to execute within an execution environment provided by said web browser;
wherein said badge code module is further configured to display an indication of content interest associated with a content source, wherein said indication is dependent upon a time rate of change of content request traffic directed to said content source, wherein said time rate of change of said content request traffic is indicative of a change in said content request traffic per unit of time, such that display of said indication of content interest by said badge code module varies according to variations in said time rate of change of said content request traffic.

2. The system as recited in claim 1, wherein said web browser is configured to download said badge code module from said content source for execution.

3. The system as recited in claim 2, wherein said content source includes a web page, wherein said web browser is configured to retrieve said web page from a host, and wherein a reference to said badge code module is embedded within said web page such that said web browser is configured to download said badge code module in response to retrieving said web page from said host.

4. The system as recited in claim 1, wherein said badge code module is further configured to:
identify a referrer of content request traffic to said content source; and
in response to identifying said referrer, instruct an administrator of a host of said referrer regarding how to configure said host of said referrer to include an instance of said badge code module.

5. The system as recited in claim 4, wherein to identify said referrer, said badge code module is further configured to identify a domain included in a Uniform Resource Locator (URL) corresponding to said referrer.

6. The system as recited in claim 5, wherein to instruct said administrator of said host of said referrer, said badge code module is further configured to cause an email to be sent to an administrative account at said domain.

7. The system as recited in claim 6, wherein said administrative account is selected from a default list of common administrative account identifiers.

8. The system as recited in claim 1, wherein said badge code module is further configured to report content request traffic directed to said content source to a traffic analysis engine, wherein said traffic analysis engine is configured to generate said indication of content interest.

9. The system as recited in claim 1, wherein said badge code module is implemented in a version of JavaScript.

10. The system as recited in claim 1, wherein said badge code module is configured for execution within a plurality of execution environments provided by a respective plurality of different web browsers.

11. A non-transitory computer-accessible storage medium comprising instructions, wherein the instructions are executable to implement:
a web browser; and
a badge code module configured to execute within an execution environment provided by said web browser;
wherein said badge code module is further configured to display an indication of content interest associated with a content source, wherein said indication is dependent upon a time rate of change of content request traffic directed to said content source, wherein said time rate of change of said content request traffic is indicative of a change in said content request traffic per unit of time, such that display of said indication of content interest by said badge code module varies according to variations in said time rate of change of said content request traffic.

12. The non-transitory computer-accessible storage medium as recited in claim 11, wherein said web browser is configured to download said badge code module from said content source for execution.

13. The non-transitory computer-accessible storage medium as recited in claim 12, wherein said content source includes a web page, wherein said web browser is configured to retrieve said web page from a host, and wherein a reference to said badge code module is embedded within said web page such that said web browser is configured to download said badge code module in response to retrieving said web page from said host.

14. The non-transitory computer-accessible storage medium as recited in claim 11, wherein said badge code module is further configured to:
identify a referrer of content request traffic to said content source; and
in response to identifying said referrer, instruct an administrator of a host of said referrer regarding how to configure said host of said referrer to include an instance of said badge code module.

15. The non-transitory computer-accessible storage medium as recited in claim 14, wherein identifying said referrer includes identifying a domain included in a Uniform Resource Locator (URL) corresponding to said referrer.

16. The non-transitory computer-accessible storage medium as recited in claim 15, wherein instructing said administrator of said host of said referrer includes causing an email to be sent to an administrative account at said domain.

17. The non-transitory computer-accessible storage medium as recited in claim 16, wherein said administrative account is selected from a default list of common administrative account identifiers.

18. The non-transitory computer-accessible storage medium as recited in claim 11, wherein said badge code module is further configured to report content request traffic directed to said content source to a traffic analysis engine, wherein said traffic analysis engine is configured to generate said indication of content interest.

19. The non-transitory computer-accessible storage medium as recited in claim 11, wherein said badge code module is implemented in a version of JavaScript.

20. The non-transitory computer-accessible storage medium as recited in claim 11, wherein said badge code module is configured for execution within a plurality of execution environments provided by a respective plurality of different web browsers.

21. A computer-implemented method, comprising:
one or more computer systems executing instructions to implement:
a badge code module executing within an execution environment provided by a web browser; and
said badge code module displaying an indication of content interest associated with a content source, wherein said indication is dependent upon a time rate of change of content request traffic directed to said content source, wherein said time rate of change of said content request traffic is indicative of a change in said content request traffic per unit of time, such that displaying of said indication of content interest by said badge code module varies according to variations in said time rate of change of said content request traffic.

22. A system, comprising:
one or more processors and a memory configured to store instructions, wherein the instructions are executable by the one or more processors to implement:
a web browser configured to generate a web browser window; and
a plugin module configured to integrate with said web browser for execution and to generate a display interface integrated within said browser window;
wherein said plugin module is further configured to display an indication of content interest associated with a content source via said display interface, wherein said indication is dependent upon a time rate of change of content request traffic directed to said content source, wherein said time rate of change of said content request traffic is indicative of a change in said content request traffic per unit of time, and wherein said plugin module is configured such that display of said indication of content interest by said plugin module varies according to variations in said time rate of change of said content request traffic.

23. The system as recited in claim 22, wherein said display interface includes a toolbar.

24. The system as recited in claim 22, wherein said plugin module is further configured to display said indication of content interest in near-real time with respect to said content request traffic directed to said content source.

25. The system as recited in claim 22, wherein to display said indication, said plugin module is further configured to visibly vary a display attribute of said indication in response to a value of said indication.

26. The system as recited in claim 25, wherein said display attribute corresponds to a font size of a textual display of said indication.

27. The system as recited in claim 25, wherein said display attribute corresponds to a color used to display said indication.

28. The system as recited in claim 22, wherein said plugin module is configured to display a set of historical values of said indication of content interest.

29. The system as recited in claim 28, wherein said set of historical values of said indication of content interest includes a set of samples of said indication taken at a specified interval over a specified period of time.

30. The system as recited in claim 22, wherein said plugin module is further configured to:
   determine whether said indication of content interest satisfies a threshold notification criterion associated with said content source; and
   in response to determining that said indication satisfies said threshold notification criterion, notify a user.

31. The system as recited in claim 30, wherein said threshold notification criterion is specified by said user.

32. The system as recited in claim 30, wherein notifying said user includes causing an email to be sent to said user.

33. The system as recited in claim 30, wherein notifying said user includes causing an instant message to be sent to said user.

34. The system as recited in claim 30, wherein notifying said user includes generating an event via a publish-subscribe protocol.

35. The system as recited in claim 34, wherein said publish-subscribe protocol is compliant with a version of RSS (Really Simple Syndication) protocol.

36. A non-transitory computer-accessible storage medium comprising program instructions, wherein the instructions are executable to implement:
   a web browser configured to generate a web browser window; and
   a plugin module configured to integrate with said web browser for execution and to generate a display interface integrated within said browser window;
   wherein said plugin module is further configured to display an indication of content interest associated with a content source via said display interface, wherein said indication is dependent upon a time rate of change of content request traffic directed to said content source, wherein said time rate of change of said content request traffic is indicative of a change in said content request traffic per unit of time, and wherein said plugin module is configured such that display of said indication of content interest by said plugin module varies according to variations in said time rate of change of said content request traffic.

37. The non-transitory computer-accessible storage medium as recited in claim 36, wherein said display interface includes a toolbar.

38. The non-transitory computer-accessible storage medium as recited in claim 36, wherein said plugin module is further configured to display said indication of content interest in near-real time with respect to said content request traffic directed to said content source.

39. The non-transitory computer-accessible storage medium as recited in claim 36, wherein to display displaying said indication, said plugin module is further configured to visibly vary a display attribute of said indication in response to a value of said indication.

40. The non-transitory computer-accessible storage medium as recited in claim 39, wherein said display attribute corresponds to a font size of a textual display of said indication.

41. The non-transitory computer-accessible storage medium as recited in claim 39, wherein said display attribute corresponds to a color used to display said indication.

42. The non-transitory computer-accessible storage medium as recited in claim 36, wherein said plugin module is configured to display a set of historical values of said indication of content interest.

43. The non-transitory computer-accessible storage medium as recited in claim 42, wherein said set of historical values of said indication of content interest includes a set of samples of said indication taken at a specified interval over a specified period of time.

44. The non-transitory computer-accessible storage medium as recited in claim 36, wherein said plugin module is further configured to:
   determine whether said indication of content interest satisfies a threshold notification criterion associated with said content source; and
   in response to determining that said indication satisfies said threshold notification criterion, notify a user.

45. The non-transitory computer-accessible storage medium as recited in claim 44, wherein said threshold notification criterion is specified by said user.

46. The non-transitory computer-accessible storage medium as recited in claim 44, wherein notifying said user includes causing an email to be sent to said user.

47. The non-transitory computer-accessible storage medium as recited in claim 44, wherein notifying said user includes causing an instant message to be sent to said user.

48. The non-transitory computer-accessible storage medium as recited in claim 44, wherein notifying said user includes generating an event via a publish-subscribe protocol.

49. The non-transitory computer-accessible storage medium as recited in claim 48, wherein said publish-subscribe protocol is compliant with a version of RSS (Really Simple Syndication) protocol.

50. A computer-implemented method, comprising:
   one or more computer systems executing instructions to implement:
      a web browser generating a web browser window;
      a plugin module generating a display interface integrated within said browser window, wherein said plugin module is integrated with said web browser for execution; and said plugin module displaying an indication of content interest associated with a content source via said display interface, wherein said indication is dependent upon a time rate of change of content request traffic directed to said content source, wherein said time rate of change of said content request traffic is indicative of a change in said content request traffic per unit of time, such that displaying of said indication of content interest by said plugin module varies according to variations in said time rate of change of said content request traffic.

* * * * *